United States Patent
Granger et al.

(10) Patent No.: US 6,334,189 B1
(45) Date of Patent: Dec. 25, 2001

(54) USE OF PSEUDOCODE TO PROTECT SOFTWARE FROM UNAUTHORIZED USE

(75) Inventors: Mark J. Granger, Azusa; Cyrus E. Smith, Monrovia; Matthew I. Hoffman, South Pasadena, all of CA (US)

(73) Assignee: Jamama, LLC, Pasadena, CA (US)

( * ) Notice: Subject to any disclaimer, the term of this patent is extended or adjusted under 35 U.S.C. 154(b) by 0 days.

(21) Appl. No.: 09/196,056

(22) Filed: Nov. 20, 1998

Related U.S. Application Data
(60) Provisional application No. 60/067,850, filed on Dec. 5, 1997.

(51) Int. Cl.[7] ............................................. G06F 1/24
(52) U.S. Cl. ..................... 713/200; 713/201; 380/255; 380/268
(58) Field of Search ................................. 713/200, 201; 380/255, 268

(56) References Cited

U.S. PATENT DOCUMENTS

| | | |
|---|---|---|
| 4,278,837 | 7/1981 | Best . |
| 4,446,519 | 5/1984 | Thomas . |
| 4,465,901 | 8/1984 | Best . |
| 4,683,968 | 8/1987 | Appelbaum et al. . |
| 4,685,055 | 8/1987 | Thomas . |

(List continued on next page.)

FOREIGN PATENT DOCUMENTS

| | | |
|---|---|---|
| WO 97/04394 | 2/1997 | (WO) . |
| WO 97/33216 | 9/1997 | (WO) . |
| WO 97/36239 | 10/1997 | (WO) . |

OTHER PUBLICATIONS

Frederick B. Cohen, "Operating system protection through program evolution" Computers & Security, 12 (1993), 565–584.

(List continued on next page.)

Primary Examiner—Thomas R. Peeso
(74) Attorney, Agent, or Firm—Knobbe, Martens, Olson & Bear LLP

(57) ABSTRACT

Three methods are disclosed for protecting software applications from unauthorized distribution and use (piracy). The first method involves using values generated by a conventional ESD (Electronic Security Device) to encrypt and/or decrypt user data (such as a file) that is generated and used by the application. In a preferred embodiment, the user data is encrypted (such as during a write to memory) using values returned by the ESD, and the user data is later decrypted using like values returned by a software-implemented ESD simulator. The second and third methods involve the use of special development tools that make the task of analyzing the application's copy protection code (such as the code used to encrypt and/or decrypt user data) significantly more difficult. Specifically, the second method involves using pseudocode to implement some or all of the application's copy protection functions. The pseudocode for a given function is generated (preferably in encrypted form) from actual code using a special development tool, and is then imbedded within the application together with a corresponding pseudocode interpreter. The interpreter fetches, decrypts and executes the pseudocode when the function is called. Because no disassemblers or other development tools exist for analyzing the pseudocode, the task of analyzing the copy protection functions becomes significantly more complex. The third method involves the use of a special obfuscation tool to convert the code for selected copy-protection functions into unnecessarily long, inefficient sequences of machine code. In one implementation of the obfuscation tool, the developer can control the quantity of code that is generated by specifying one or more control parameters. The three methods can also be used to protect software license management systems from security attacks.

30 Claims, 11 Drawing Sheets

U.S. PATENT DOCUMENTS

| | | |
|---|---|---|
| 4,757,534 | 7/1988 | Matyas et al. . |
| 4,817,140 | 3/1989 | Chandra et al. . |
| 4,959,861 | 9/1990 | Howlette . |
| 5,081,676 | 1/1992 | Chou et al. . |
| 5,109,413 | 4/1992 | Comerford et al. . |
| 5,123,045 | 6/1992 | Ostrovsky et al. . |
| 5,148,534 | 9/1992 | Comerford . |
| 5,222,134 | 6/1993 | Waite et al. . |
| 5,287,408 | 2/1994 | Samson . |
| 5,390,297 | 2/1995 | Barber et al. . |
| 5,416,840 | 5/1995 | Cane et al. . |
| 5,610,981 * | 3/1997 | Mooney et al. ............ 380/25 |
| 5,666,411 | 9/1997 | McCarty . |
| 5,671,275 | 9/1997 | Ezuriko . |
| 5,671,412 | 9/1997 | Christiano . |
| 5,675,645 | 10/1997 | Schwartz et al. . |
| 5,692,047 * | 11/1997 | McManis ................... 380/4 |
| 6,067,575 * | 5/2000 | McManis et al. .......... 709/300 |

OTHER PUBLICATIONS

Peter Wayner, "JBuilder Makes Java a Piece of Cake" *Byte Magazine*, (Oct. 1997), p. 34.

Oded Goldreich, "Towards a Theory of Software Protection" Lecture Notes in Computer Science #263, Advances in Cryptology–Crypto '86 Springer–Verlag (Undated), 426–439.

Hollmann, Linnartz, Lint, Baggen and Tolhuizen, "Protection of software algorithms executed on secure modules" Future Generation Computer Systems 13 (1997), 55–63.

Josep Domingo–Ferrer, "Algorithm–Sequenced Access Control" Computers & Securities, 10 (1991), 639–652.

Cynthia Dwork, Jeffrey Lotspiech and Moni Naor, "Digital Signets: Self–Enforcing Protection of Digital Information" ACM Press Proceedings of the Twenty–Eighth Annual ACM Symposium on the Theory of Computing (May 22–24, 1996) 489–498.

Steve R. White and Liam Comerford, "Abyss: A Trusted Architecture for Software Protection" 1987 IEEE Symposium on Security and Privacy, (Apr. 27–29, 1987) 38–51.

David McCandless, "Warez Wars" Wired, (Apr. 1997) 133–180.

Seven pages downloaded from Micromacro.com Web Site on Sep. 6, 1997.

1 page letter from Electric Image Incorporated, by Matthew I. Hoffman, dated Feb. 19, 1998.

* cited by examiner

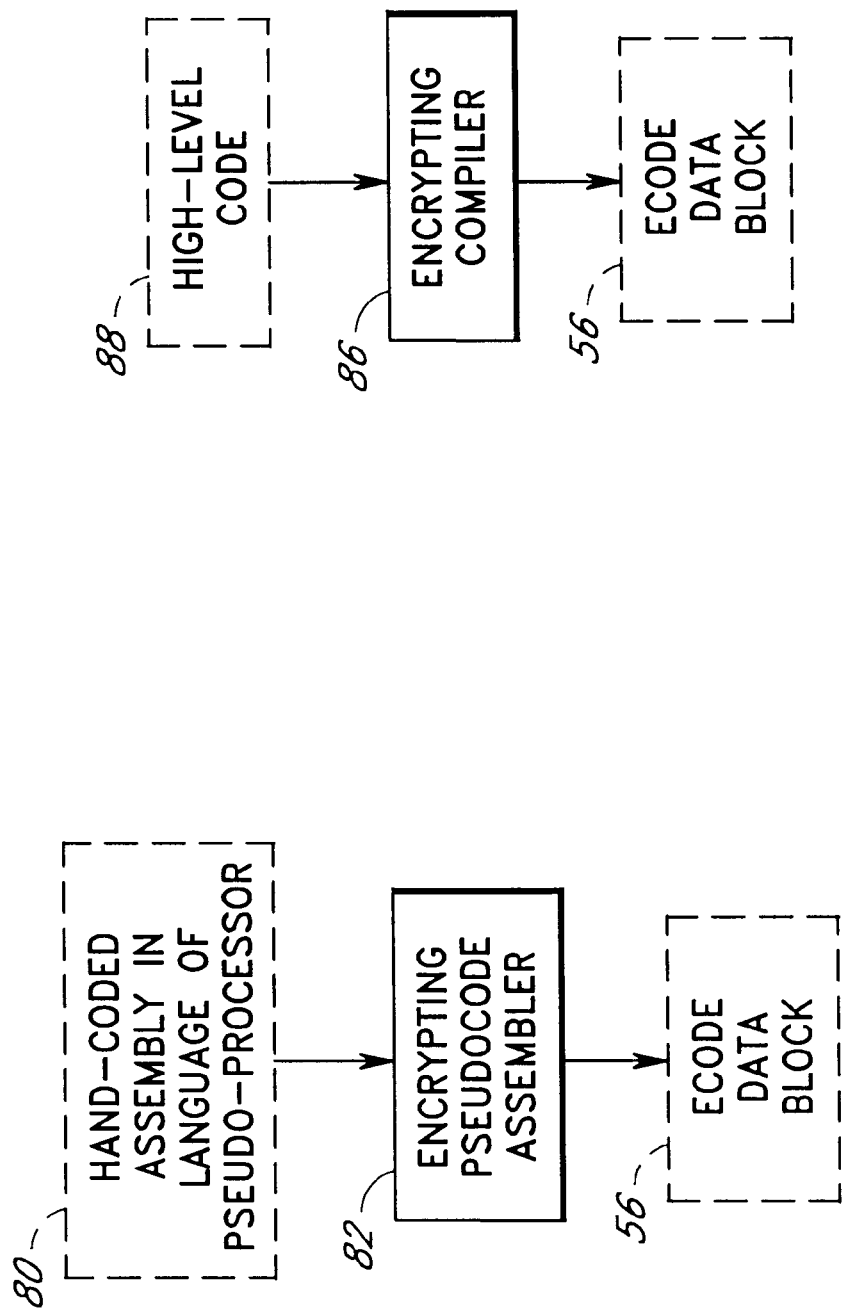

USE OF PSEUDOCODE TO PROTECT SOFTWARE FROM UNAUTHORIZED USE

RELATED APPLICATIONS

This application claims the benefit of U.S. Provisional Appl. No. 60/067,850, filed Dec. 5, 1997, titled SYSTEM AND METHODS FOR CONTROLLING USE OF PROTECTED SOFTWARE. Filed concurrently with the present application are two related applications, titled SOFTWARE SYSTEM AND ASSOCIATED METHODS FOR CONTROLLING THE USE OF COMPUTER PROGRAMS and OBFUSCATION SYSTEM AND METHOD FOR CONCEALING DETAILS OF ANTI-PIRACY SCHEME, both of which share the same disclose as that of the present application.

FIELD OF THE INVENTION

The present invention relates to methods for preventing the unauthorized distribution and use of computer programs. More particularly, the present invention relates to methods for impairing the ability of software pirates to remove or disable the executable copy protection code, or other security code, within a computer program.

BACKGROUND OF THE INVENTION

Software products (applications) are highly vulnerable to unauthorized copying and use (piracy). Illegally copied applications are commonly distributed on a wide-scale basis over the Internet and via recordable CD-ROMs. Software developers lose billions of dollars per year as a result of such unauthorized copying and distribution.

Software developers commonly use a variety of different forms of copy protection to prevent others from illegally copying and using their products. One of the most robust methods involves the use of an Electronic Security Device (ESD) which attaches to a port of the end user's computer and communicates with the application. If the ESD is not attached to the user's computer, the application crashes or otherwise fails to operate properly.

Typically, the ESD is in the form of an electronic circuit which receives a numerical "seed" value from the application, applies a hardware-implemented number calculation algorithm to the seed value, and returns a "response" value to the application. To test for the existence of the ESD, the application's copy protection code sends one or more seed values to the ESD and compares the resulting response values with expected response values. The expected values can be generated by the software developer at development time (such as through experimentation with the ESD), or can be generated "on-the-fly" during execution by implementing the ESD's number calculation algorithm (if known to the software developer) within the copy protection code.

Another type of system for controlling the use of applications involves using a license management server to control the number of copies of an application that can concurrently run on a network. With this type of system, the application will run properly only if it has checked out an authorization certificate from the license management server. When a user launches the application on a workstation of the network, the application requests an authorization certificate from the license server. If less than the maximum authorized number of copies are currently running, the license server dispatches an encrypted certificate to the workstation to unlock the application.

A variety of techniques also exist for making it more difficult for pirates to analyze an application's copy protection or other security code. One such technique involves storing the application's executable code in an encrypted form to hide the details of the security scheme, and decrypting the code as it is executed or loaded into memory. Another technique involves inserting "dummy" machine instructions within the application's machine code to throw-off disassemblers.

Despite the sophistication of modern ESDs, and the significant time dedicated by software developers to writing better copy protection code, software pirates are often able to defeat copy protection schemes with relative ease. This is commonly done by using the latest software development tools to locate and circumvent the application's copy protection code. The modifications needed to remove or circumvent the application's copy protection code are commonly distributed by the pirate as a small, separate piece of code (patch). A user can execute the patch to create a modified (cracked) version of the application which will run without the ESD, or which will otherwise operate without use of the copy protection scheme. Once a cracked version of a product becomes available, the software developer has lost much of its investment in its product.

A stronger form of copy protection is therefore needed. Ideally, software developers should be able to add the copy protection code without considerable time or effort, yet the resulting protection scheme should be extremely difficult and time consuming to analyze and circumvent.

SUMMARY OF THE INVENTION

The present invention provides three methods or "layers" for protecting software applications from unauthorized distribution and use (piracy). Each method can be used independently of the others, although the methods are preferably used in combination.

The first method involves using values generated by a conventional ESD (Electronic Security Device) to encrypt and/or decrypt user data (such as a file) that is generated and used by the application. In a preferred embodiment, the user data is encrypted (such as during a write to memory) using values returned by the ESD, and the user data is later decrypted using like values returned by a software-implemented ESD simulator. An important aspect of this method is that it does not rely on the use of comparisons to determine whether or not the ESD is attached. As a result, a pirate cannot disable the copy protection by simply modifying or removing code that compares response values to expected values. A related benefit is that the application continues to operate (although not properly) when no ESD is attached, making the task of identifying the copy protection code considerably more difficult.

The second and third methods involve the use of special development tools that make the task of analyzing the application's copy protection code (such as the code used to encrypt and/or decrypt user data in method 1) significantly more difficult. Specifically, the second method involves using pseudocode to implement some or all of the application's copy protection or other use-authorization functions. The pseudocode for a given function is generated (preferably in encrypted form) from actual code using a special development tool, and is then imbedded within the application together with a corresponding pseudocode interpreter. The interpreter fetches, decrypts and executes the pseudocode when the function is called. Because no disassemblers or other development tools exist for analyzing the pseudocode, the task of analyzing the copy protection functions becomes significantly more complex.

The third method involves the use of a special obfuscation tool which converts the code for selected copy-protection or other functions into unnecessarily long, relatively inefficient sequences of (obfuscated) machine code. For example, the developer can convert a method 1K block of copy protection code into a method 500K block of code that performs the same function. In one implementation of the obfuscation tool, the developer can control the quantity of code that is generated by specifying one or more control parameters. As with the pseudocode method, the use of the obfuscation tool makes the task of evaluating the application's copy-protection functions considerably more difficult.

The invention also provides various enhancements to the above methods. One such enhancement, for example, involves the intertwining of copy-protection and non-copy-protection functions within a single block of obfuscated code or pseudocode. A non-copy-protection function that is necessary to the proper operation of the application is preferably used for this purpose, so that attempts to remove the block of code from the application will render the application inoperative.

BRIEF DESCRIPTION OF THE DRAWINGS

FIGS. 5 and 6 illustrate two alternative methods for generating encrypted pseudocode.

Figure 1A:
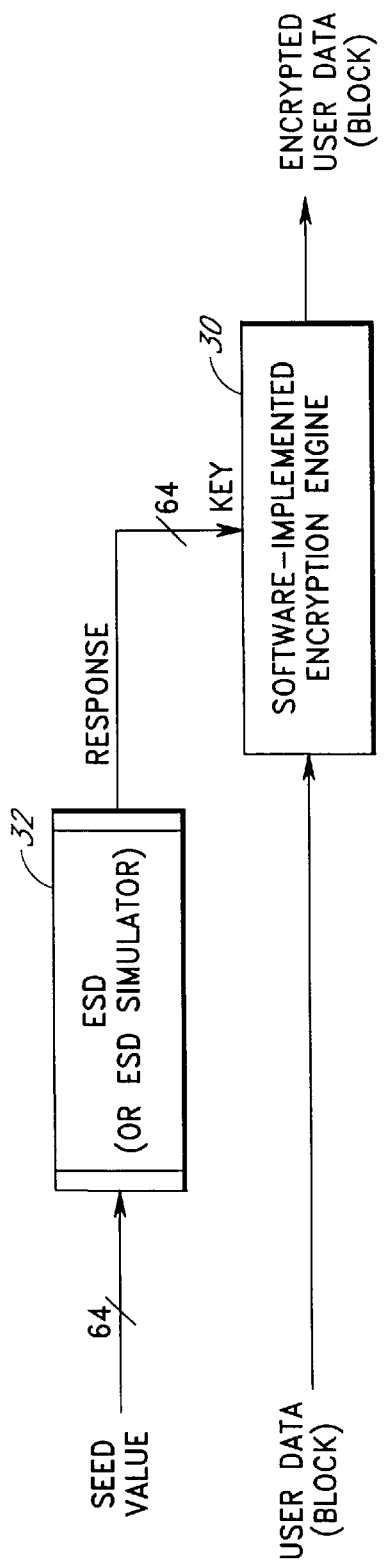
FIGS. 1A and 1B illustrate respective processes for encrypting and decrypting user data in accordance with one feature of the invention.

Throughout the drawings, like reference numbers are used to reference components that are the same or functionally similar. In addition, a number followed by an apostrophe indicates that the referenced component is a functional counterpart of a component with the same number (e.g., 30 and 30' represent functional counterparts).

DETAILED DESCRIPTION OF THE PREFERRED EMBODIMENTS

I. Terminology

As used hereinafter, the following terms have the following meanings (except where specifically indicated otherwise):

The term "application" refers to the target program to which one or more copy protection schemes are being or have been applied to deter unauthorized use. An application may include multiple code modules, including modules that run remotely from one another. Examples of applications include word processing programs, 3D animation programs, spreadsheet programs, online banking programs, and operating systems.

The term "ESD" (Electronic Security Device) refers to an electronic device that communicates with an application to provide protection against the use of unauthorized copies of the application. ESDs commonly attach to an external port of a computer, and communicate with the application using code modules that are provided by the manufacturer of the ESD. An ESD can alternatively be implemented, for example, as a chip on the motherboard of the computer, or as unit of the computer's microprocessor.

The term "user data" refers to data that is generated by an application (or a component thereof) based on the input of a user. User data may include, for example, a document generated by a word processing program, a configuration file generated by an operating system, a matrix table generated by a 3D animation program, or a portion of any such items.

The term "high-level code" refers to textual code written in a high-level programming language (such as C, C++, Pascal or Java) that provides a level of abstraction from the underlying machine language. High-level code is typically non-processor-specific, meaning that it does not correspond to a particular machine-level instruction set. In contrast, "assembly code" is textual code written in the low-level assembly language (a language in which machine-level instructions are represented by mnemonic codes) of a particular processor or family of processors. "Machine code" refers to the low-level numerical (binary) code that is directly retrieved and processed by a microprocessor. "Machine-level" code refers generally to code that is in either machine code or assembly code form.

The term "pseudocode" refers to machine code that is executed by a software-implemented processor. Typically (and in the preferred embodiment described herein), the pseudocode is written in the machine language of a non-existent machine or processor.

The term "copy protection code" refers to executable code (whether in high-level or low-level form) that implements an authorization verification scheme to prevent or deter the use of unauthorized copies of an application. Copy protection code commonly includes code that communicates with an ESD to confirm that the application is running on a computer that includes a valid ESD. In the preferred embodiment of the invention, the copy protection code also includes, among other things, encryption code that encrypts and/or decrypts user data based on values returned by an ESD.

The term "software developer" or "developer" refers to an individual or entity that develops applications. The term "pirate" refers to an individual or entity that is seeking to defeat a copy protection scheme that has been applied to an application, such as by removing or modifying an application's copy protection code to produce a "cracked" version that runs properly without the use of an ESD.

Other terms are introduced and defined throughout the detailed description.

II. Branch-Level Copy Protection

To facilitate the reader's understanding of the invention, a prevalent technique for using an ESD to provide copy protection will initially be described.

As indicated above, an ESD typically operates by receiving a seed value from the application and returning a corresponding response value to the application. The response value is commonly generated by the ESD by applying a one-way hash function or similar number calculation function to the seed value. With many ESDs, the software developer can pre-program the ESD's number calculation function by storing a secret value within the ESD before the device is shipped.

To protect a software application using the pre-programmed ESD, the software developer typically intersperses calls to the ESD throughout the application's source code using seed values for which the corresponding response values are already known. Each time a call to the ESD is made, the application compares the response value to the expected response value. If the ESD returns an unexpected value (or fails to respond) during program execution (indicating that there is not an authorized ESD attached to the computer), the application will typically shut down or display an appropriate warning message. The expected response values can be generated by the software developer during the development of the application by writing a small utility that sends seed values to the pre-programmed ESD and records the response values that are returned.

A variation of the above approach involves implementing the number calculation function within the application code to provide an ESD simulator. This approach is normally possible only if the software developer has access to the hash or other number calculation algorithm used by the ESD. When this approach is used, source code is included within the application to generate and send random seed values to both the ESD and the ESD simulator. The respective values returned by the ESD and the ESD simulator are compared by the application's copy protection code to determine whether a valid ESD is attached.

The above-described techniques are referred to herein as "branch-level" copy protection, since they involve branches that are contingent upon the outcome of a numerical comparison. In practice, pirates have been able to disable branch-level copy protection schemes with relative ease. To disable a branch-level copy protection scheme, the pirate can use commercially-available software development tools to locate all of the calls to the ESD. This may be done, for example, by using a commercially-available debugger program to monitor accesses to memory addresses that correspond to the ESD. Once the calls to the ESD have been located, the pirate can use a disassembler or other tool to locate and remove the code that is used to compare the response values to the expected values.

The pirate can alternatively replace the calls to the ESD with code that emulates the ESD. If the application always sends the same seed values to the ESD, the pirate can make note of the response values that are returned by the ESD, and then replace the calls with code that returns these numbers. If the application uses the random number approach, the pirate can attempt to reverse engineer or extract the code that implements the ESD's number calculation algorithm, and then replace the calls to the ESD with code that implements the algorithm.

As described below, the copy protection methods of the present invention overcome these and other weaknesses in prior art approaches.

III. Overview

The present invention provides three separate copy protection techniques, all of which are implemented entirely through software. These techniques can also be used to protect network-based license management systems from tampering.

The three techniques can be viewed as three separate "layers" of protection. These layers are referred to herein as the Encryption Layer, the Pseudocode Layer, and the Obfuscation Layer. Each layer can be used independently of the others, and only one of the layers (the Encryption Layer) requires the use of an ESD. In the preferred embodiment, the Encryption Layer is used in combination with either or both of the Pseudocode and Obfuscation Layers. Each of the three layers is summarized below and is described in further detail in the subsequent sections.

The Encryption Layer involves the use of copy protection code which communicates with an ESD. As with prior art techniques, the copy protection code sends seed values to the ESD and receives response values from the ESD. In contrast to prior art techniques, however, the response values are not compared to expected values to determine whether a valid ESD is attached. Rather, the response values are used by the application's copy protection code as a key for encrypting and/or decrypting user data that is generated and used by the application. (As described below, a software-implemented ESD simulator is preferably used in place of the ESD to generate either the encryption key or the decryption key).

The user data may, for example, be a row of a spread sheet document generated by a spreadsheet application, or may be a document generated by a word processing program. An important characteristic of such data is that it changes from use to use of the application based on the actions of the user. The user data may be encrypted, for example, when the data is written to RAM (random access memory) or mass storage, and may be decrypted when the data is subsequently retrieved or accessed by the application. User data is also preferably used to generate the seed value that is sent to the ESD (or ESD simulator).

An important aspect of this method is that it does not rely on the use of comparisons to determine whether or not the ESD is attached. (A single comparison is preferably performed when the application is launched so that the user can be informed when the ESD is not properly attached.) As a result, a pirate cannot disable the copy protection by simply modifying or removing code that compares response values to expected values. A related benefit is that the application continues to operate (although not properly) when no ESD is attached. This makes it considerably more difficult for the pirate to identify the copy protection code that needs to be disabled in order to crack the application. Another benefit is that the method can be used to protect a wide range of different types of applications.

The Pseudocode Layer and the Obfuscation Layer, as used in the preferred embodiment, serve the purpose of concealing the implementation details of the Encryption Layer from pirates. In the preferred embodiment, for example, these layers are used (either alone or in combination) to hide the details of the algorithm used to encrypt and decrypt the user data. As will be apparent, however, the techniques used to implement the Pseudocode Layer and the Obfuscation Layer can be used to hide the details of other types of copy protection schemes, including schemes that do not involve the use of an ESD. For example, these techniques could be used to hide the comparisons that are performed in conventional branch-level copy protection, or could be used to hide the algorithm of a decryption engine that decrypts executable code.

The Pseudocode Layer involves the use of pseudocode to implement important copy protection functions of the application. The pseudocode is preferably written in a language of a non-existent machine or microprocessor, so that pirates cannot use commercially-available software development tools to disassemble and evaluate such copy protection functions.

In one implementation, the Encryption Layer code which performs the encryption and decryption of user data is written in pseudocode. The pseudocode is preferably imbedded within the application code as an encrypted data table, together with data constants and temporary variables that are used by the code. During execution of the application, a pseudocode interpreter (also imbedded within the application) decrypts and processes the pseudocode line-by-line to perform the underlying copy protection functions. Because no disassemblers, debuggers, or other development tools are available to pirates for analyzing the pseudocode, pirates cannot analyze the important copy protection functions using their usual techniques.

To use this method, the software developer initially selects the copy protection function or functions that are to be implemented in pseudocode. One or more non-copy-protection functions may also be selected to make it more difficult for pirates to identify the application's copy protection code. Because the use of pseudocode produces a degradation in performance, it is preferable to select functions for which performance is not a significant concern. For example, a function that is called only on an occasional basis will typically be a better candidate than a function that is called on every pass of a heavily-executed program loop.

Once appropriate functions have been selected, the developer generates the pseudocode for each function. This is preferably accomplished using one of two methods. The first method involves initially writing the code for implementing each selected function in a special assembly language which corresponds to pseudocode language. This assembly language code is then passed through a special pseudocode assembler which translates the special assembly code into encrypted pseudocode. Existing implementations of such an assembler (referred to as the "EASM") and a corresponding interpreter (referred to as the "SPEC") that are capable of running under the Mac OS, Windows NT, Unix and other operating systems are described in detail below. In practice, the assembler and the interpreter may be maintained by the software developer as internal, proprietary development tools so that the details of the pseudocode/interpreter implementation are maintained in confidence. Alternatively, a publicly-available assembler and interpreter can be provided that enable software developers to freely modify the implementation details (such as the pseudocode instruction set) by adjusting configuration settings.

The second method of generating the pseudocode involves the use of a special compiler which generates the encrypted pseudocode. With this method, the code for implementing the selected function is initially written in a high-level language, and is then compiled to generate the pseudocode. As with the assembler method, the compiler can either be a proprietary development tool of the software developer, or can be a commercially-available tool that enables software developers to modify the pseudocode implementation.

The Obfuscation Layer involves the use of a special development tool to translate selected blocks of the copy-protection code (and possibly other types of code) into much larger, less efficient blocks of code, so that the pirate has to disassemble and analyze significantly greater amounts of machine code to extract the function(s) or algorithm(s) performed by such code. For example, a 5K (kilobyte) block of machine code that implements an encryption algorithm (such as the algorithm used to encrypt user data) can be converted into a 100K block of machine code that implements the same algorithm. The pirate would then have to disassemble and analyze the entire 100K block of machine code to extract the algorithm.

This process of translating blocks of code into equivalent, less efficient blocks of code is referred to herein as "de-optimizing obfuscation." The code generated by this process (whether in high-level or low-level form) is referred to generally as "obfuscated code," and is referred to more specifically as "obfuscated machine code" when in the machine-language form. The development tool used to generate the obfuscated code is referred to generically as the "obfuscation tool." As described below, the de-optimizing obfuscation process can be performed either on the high-level code or the corresponding low-level code to ultimately produce obfuscated machine code.

The obfuscation tool generates the obfuscated code at least in-part by converting pre-specified types of operations into equivalent operations that involve greater numbers of machine-level instructions. For example, the obfuscation tool may be configured to translate the mathematical operation $C=A+B$ into either of the following equivalent sequence of operations: $X=A/2$, $Y=B/2$, $C=2X+2Y$; or $C=2A$, $B=2B$, $C=(C+B)/2$. Non-mathematical operations, such as logical operations and moves of data between registers and memory, can similarly be translated into less efficient, equivalent operations. For example, a register-to-register move can be translated into a register-to-memory move followed by a memory-to-register move. The de-optimizing obfuscation process can be repeated any number of times to further increase the number of lines of code (and thus the level of obfuscation). Thus, for example, a single line of code can be converted into 1,000 or 1,000,000 lines of code, all of which are executed to perform the equivalent operation.

Various methods exist for generating the obfuscated code, each of which involves a different type of obfuscation tool. In the preferred embodiment, the function to be implemented through obfuscated code is initially written in a high-level programming language. The resulting block of high-level code is then processed with a special, de-optimizing cross-compiler (the obfuscation tool) one or more times to generate a much larger block of obfuscated high-level code. The obfuscated high-level code is then compiled (using a regular compiler program) with the other application source code to generate the machine-level application code. During this second compilation process, the obfuscated high-level code compiles into a proportionally larger block of machine code than would result if the original high-level code were used. Thus, the process produces obfuscated machine code that is considerably more complex and difficult to analyze.

Another method involves the use of a de-optimizing compiler that converts the high-level code directly into obfuscated assembly or machine code. The obfuscated assembly or machine code is then imbedded within the application's source code files. Yet another method involves the use of a de-optimizing cross-assembler that converts a block of assembly code into obfuscated assembly code.

Regardless of the method used, the obfuscation tool (de-optimizing compiler, de-optimizing cross assembler, etc.) preferably allows the developer to enter one or more control parameters that specify the level of obfuscation. For example, in one embodiment, the developer can specify the target ratio of the number of lines of obfuscated code to the number of lines of original code. Using this feature, the developer can, for example, enter a target ratio of 1000 to effectively multiply the number of lines of code by 1000. An important benefit of this feature is that it allows the developer to select a level of obfuscation (code multiplication) that maintains the function's performance at an acceptable level. As with the Pseudocode Layer, the overall performance of the application can also be controlled by appropriately selecting the functions to be implemented in obfuscated machine code.

The appropriate combination of the Encryption Layer with either or both of the Pseudocode Layer and the Obfuscation Layer produces an extremely high level of copy protection in which the implementation details of the Encryption Layer are extremely difficult to extract. An important benefit of this multi-layered copy protection method is that it is relatively simple for software developers to implement, particularly because the pseudocode and obfuscation techniques make use of easy-to-use, reusable development tools. Moreover, once the multi-layered approach has been applied to an application, the implementation can very easily be modified, such as when a new version of the application is released. For example, to change the encryption algorithm used to encrypt user data, the developer would simply rewrite the encryption function, and then convert the encryption function into either encrypted pseudocode (using either the pseudocode assembler or the special compiler) or obfuscated code (using a de-optimizing compiler or other obfuscation tool). The resulting code segment would then simply be compiled into the application code.

The present invention also provides several techniques for further enhancing the level of copy protection provided by the three layers. One such technique involves combining the Pseudocode and Obfuscation Layers in a manner which produces a synergistic effect. This may be done, for example, by implementing selected portions of the interpreter in obfuscated code to make the task of reverse engineering the interpreter more difficult; or by imbedding an obfuscation tool within the pseudocode generator (e.g., the pseudocode assembler or the special compiler) to produce obfuscated pseudocode. Another enhancement technique involves the intermingling of copy-protection and non-copy-protection functions within a single block of code, such as a block of pseudocode or a block of obfuscated code.

Specific implementations and combinations of the Encryption Layer, the Pseudocode Layer and the Obfuscation Layer are described below. Throughout these descriptions, reference will be made to various implementation-specific details, including, for example, specific encryption algorithms, data structures, obfuscation rules, and types and formats of pseudocode instructions. These details are provided in order to fully set forth a preferred embodiment of the invention, and not to limit the scope of the invention. The scope of the invention is set forth in the appended claims.

IV. The Encryption Layer

Various types of commercially-available ESDs can be used to practice the features of the Encryption Layer. In the preferred embodiment described below, an ESD that receives a 64-bit seed value and returns a 64-bit response value is used. The response value is generated by the ESD by applying a one-way hash function to the seed value and a 64-bit "K-value." The K-value is programmed into the ESDs by the software developer prior to shipping the ESDs to customers, and is maintained in secrecy by the software developer. Because each of the $2^{64}$ possible K-values makes the hash function operate differently, knowledge of the hash function does appreciably compromise security. ESDs of this type are available from such companies as Rainbow Technologies Inc. and Micro Macro Technologies Ltd.

Figure 1B:
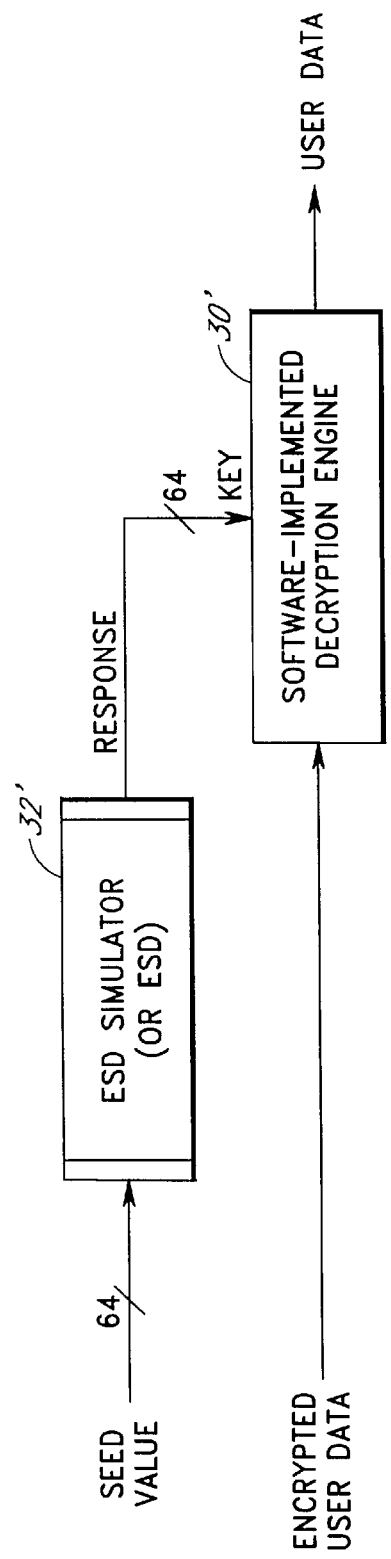

FIGS. 1A and 1B illustrates the Encryption Layer process that is used to encrypt (FIG. 1A) and decrypt (FIG. 1B) the user data. This process is implemented by copy protection code that is added to the application during the development process. As indicated above, the process can be implemented in-whole or in-part in pseudocode or obfuscated machine code.

As depicted by FIG. 1A, a block of user data is encrypted using a software-implemented encryption engine 30 to produce an encrypted block of user data. Any type and quantity of user data can be used for this purpose. For example, the block of user data may consist of the first 64 bytes of a file that is being written to mass storage, or may be a table entry that is being written to RAM.

The encryption engine 30 applies a key-based encryption algorithm to the block of user data. Any of a variety of encryption algorithms can be used for this purpose, including, for example, DES, RSA, or an exclusive-OR (XOR) algorithm. More complex encryption algorithms such as RSA generally produce a higher degree of protection at the expense of decreased performance.

As further depicted in FIG. 1A, the encryption engine 30 encrypts the user data based on a 64-bit seed value generated by the ESD 32. As discussed below, a software-implemented ESD simulator may alternatively be used on either the encryption (FIG. 1A) or decryption (FIG. 1B) side of the process. The seed value is generated by sending a 64-bit seed value to the ESD 32. Although FIGS. 1A and 1B depict a scheme in which the ESD's response value is used as the key, the response value could alternatively by combined with other data, and/or further manipulated, to generate the key.

The seed value may be a constant, or may be generated by the application using an appropriate technique. Preferably, the seed value is generated from a block of user data other than the block of data to be encrypted. For example, if the block of user data to be encrypted is part of a file being written to mass storage, another block of the file (such as the last 64 bits) can be used as the seed. Alternatively, a portion of the file can be appropriately combined with other information (such as the version number of the application), and/or manipulated using a logic function, to produce the 64-bit seed value. Regardless of the technique used to generate the seed, the application must be able to reproduce the seed at decryption time so that the data block can be properly decrypted.

As depicted by FIG. 1B, the process of decrypting the data block is identical to the FIG. 1A process except that a software-implemented decryption engine 30' is used in place of the encryption engine 30. The decryption engine 30' implements a decryption algorithm which is the inverse of the algorithm used to encrypt the user data. Because the same seed value is used to generate the decryption key, the decryption key is the same as the encryption key, and the original block of user data is reproduced.

In implementing the above process, it is possible to use the ESD 32 during both the encryption phase (FIG. 1A) and the decryption phase (FIG. 1B). However, this would potentially enable a pirate to circumvent the copy protection scheme by replacing the code which queries the ESD (on both the encryption side and the decryption side) with a piece of code that always returns the same 64-bit response value. It is therefore preferable to use an ESD simulator 32' in place of the ESD 32 on either the encryption side or the decryption side of the process. An important benefit of this approach is that "calls" to ESD simulator are significantly more difficult for pirates to detect than calls to an actual ESD. For purposes of the remaining description, it may be assumed that an ESD simulator is used during the decryption phase.

The addition of the ESD simulator 32' to the application can be accomplished by adding code which implements the ESD's number calculation algorithm. This method requires the software developer to know the hash or other number calculation algorithm implemented within the actual ESD. In addition, implementing the number calculation algorithm within the application increases the likelihood that a pirate will be able to reverse engineer the algorithm (although the Pseudocode Layer and Obfuscation Layer techniques can be used to hide the details of this algorithm).

It is therefore preferable to use a look-up table approach which involves the use of an encrypted look-up table of seed-response pairs. As described below, the look-up table can be generated by the developer without knowledge of the ESD's number calculation function. One advantage of the look-up table approach is that even if the pirate obtains access to the seed-response pairs in the look-up table, these numbers will not reveal the number calculation algorithm of the ESD.

Figure 2:
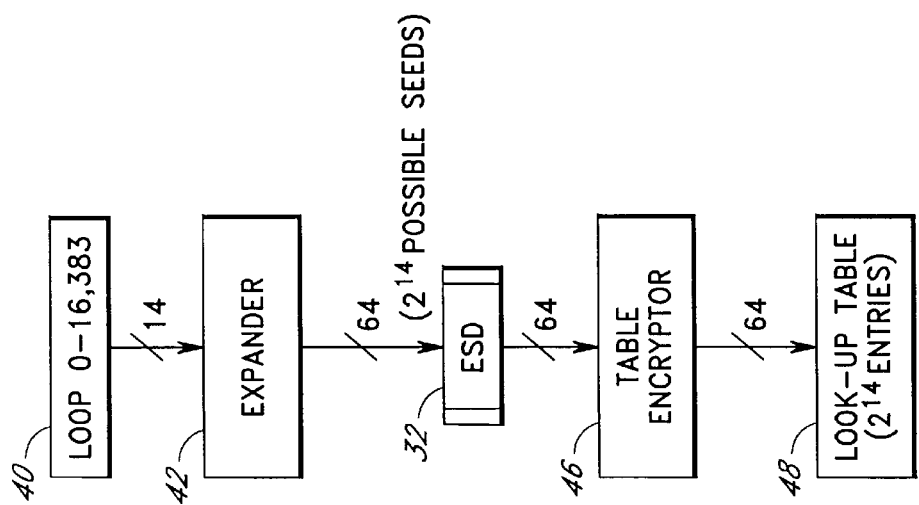
FIG. 2 illustrates a process for generating a look-up table for use within an ESD simulator.

Because it is not practical include all of the ESD's $2^r$ seed-response pairs within the ESD simulator's look-up table, a condensed look-up table that consists of a relatively small subset of seed-response pairs is used. As described below, a condenser function is then used to ensure that seed values passed to the actual ESD correspond to the seed-response pairs stored in the loop-up table. FIG. 2 illustrates the operation of a small utility which can be written and executed during the development process to generate the look-up table. The expander block 42 and the table encryptor block 46 represent functions that are performed by the utility, and the look-up table 48 represents the output of the utility.

This utility operates generally by sending $2^{14}$=16,384 seed values to the ESD 32, encrypting the response values that are returned, and recording the $2^{14}$ encrypted response values within the table 48. As depicted by blocks 40 and 42, the utility loops from 0 to 16,383, and in each pass of the loop, applies an expander function to a 14-bit loop counter. The expander 42 translates each of the loop counter values into a unique 64-bit seed value to be passed to the ESD. A simple approach to implementing the expander 42 is to multiply the 14-bit loop counter by a constant (such as 2FFFH) to generate the 64-bit seed value.

As illustrated by block 46 of FIG. 2, each of the 64-bit response values returned by the ESD 32 is encrypted before being stored in the look-up table 48. Any type of encryption algorithm can be used for this purpose. Once the look-up table 48 has been generated, both the look-up table and the key used to perform the table encryption are imbedded within the application.

Figure 3A:
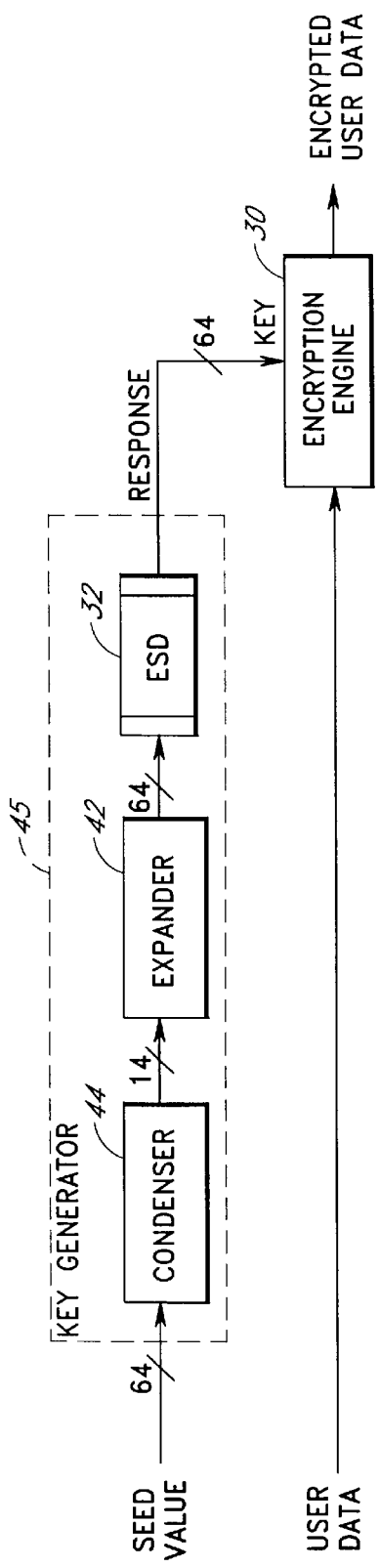
FIGS. 3A and 3B illustrate respective processes for encrypting and decrypting the user data when a table-based ESD simulator is used on the decryption side.
Figure 3B:
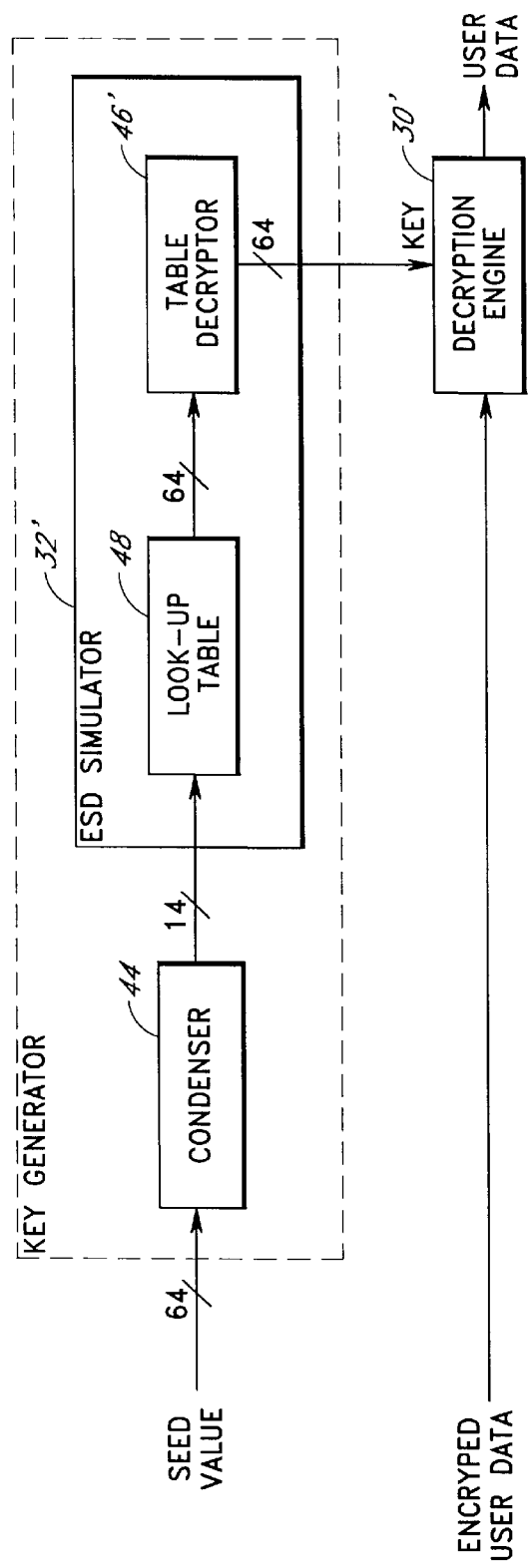

FIGS. 3A and 3B illustrate the modified process that is used by the application to encrypt (FIG. 3A) and decrypt (FIG. 3B) the block of user data when a table-based ESD simulator 32' is used on the decryption side. It is assumed in this illustration that the look-up table 48 used by the ESD simulator 32' has been generated using the process of FIG. 2. With the exception of the ESD, all of the blocks shown in FIGS. 3A and 3B represent components of the application.

As illustrated by FIG. 3A, a condenser 44 and an expander 42 (both implemented in executable code of the application) are added to the key generation process 45 on the encryption side to ensure that each seed value passed to the ESD 32 corresponds to one of the $2^{14}$ seed-response pairs represented within the look-up table 32'. The function performed by the expander 42 of FIG. 3A is identical to that of the expander of FIG. 2. In operation, each 64-bit seed value is initially passed to the condenser 44. The condenser 44 translates each seed value it receives into a 14-bit value, and passes the 14-bit value to the expander 42. The condenser may operate, for example, by simply bit-ANDing the 64-bit value with the constant 2FFFH. The expander 42 translates the 14-bit value back to a 64-bit value, and the resulting 64-bit value is passed to the ESD as a seed. This seed value will always be one of the $2^{14}$ seed values passed to the ESD during the FIG. 2 table generation process. Thus, the condenser/expander pair effectively maps each of the $2^{64}$ possible seed values into one of the $2^{14}$ seed values represented within the look-up table 48. The response value returned by the ESD is used to encrypt the block of user data in the same manner as in FIG. 1A.

As illustrated by FIG. 3B, during the decryption phase the seed value is similarly passed to a condenser 44 (which is identical to the condenser of FIG. 3A), and the output of the condenser is passed as a look-up table index to the ESD simulator 32'. The ESD simulator 32' uses this 14-bit value to retrieve the corresponding encrypted response value from the look-up table 48, and decrypts the response value using a table decryptor 46'. The table decryptor 46' decrypts the response values using the key value that was used by the table encryptor 46 (FIG. 2). The output of the ESD simulator 32' is passed to the decryption engine 30' as the key for decrypting the block of encrypted user data.

It will be appreciated that various alternatives to the method of FIGS. 3A and 3B are possible. For example, if the user data involves a file being written to mass storage, a first block of the file could be encrypted using the ESD 32 and a second block of the file could be encrypted using the ESD simulator 32'. During the decryption phase, the first block would then be decrypted using the ESD simulator, and the second block would be decrypted using the ESD.

The level of security provided by the technique of FIGS. 3A and 3B can be further improved by having the decryption portion of the code (and/or the encryption portion) perform a useful calculation or other function that is part of the normal (non-copy-protection) operation of the application. For example, if the application is a spreadsheet program, the function of multiplying the values of a spreadsheet array by a number N can be integrated into the application's encryption and decryption code as follows. When the application is about to perform the multiply operation, the application can enter into the encryption phase, and during the encryption phase, can multiply the array (i.e., multiply each value of the array) by a random number R that is based on an ESD calculation. During the decryption phase, the decryption code (e.g., the code used to implement the decryption engine 30') could multiply the array by N/R. This technique would require the pirate not only to remove both the encryption code and the decryption code, but also to replace the decryption code with code to multiply the array by N.

This technique of intertwining copy protection and non-copy-protection functions within the same routine is referred to herein as "intermingling." Other types of functions that can be intermingled with the encryption and decryption code will be apparent to those skilled in the art. As described below, intermingling provides an extremely robust method of copy protection when the intermingled code is provided in pseudocode or obfuscated machine code.

The above-described Encryption Layer techniques can be used to protect virtually any type of application or application component that generates and processes user data. If the application includes one component that is used to generate the user data and another component that is used at a remote site to process the user data, one component can conveniently use the ESD while the other component uses the ESD simulator. This avoids the need to have multiple ESDs.

Although the Encryption Layer techniques (and particularly the technique of FIGS. 3A and 3B) provide significantly greater security than is provided by conventional branch-level copy protection, it is possible that a dedicated pirate could still remove the copy protection by reverse engineering the Encryption Layer components. It is therefore desirable to have a mechanism for hiding the implementation details of these components. The Pseudocode Layer and the Obfuscation Layer provide two separate mechanisms for hiding such details.

With reference to FIGS. 3A and 3B, the primary components that include copy protection code for which it is desirable to hide the implementation details are the condenser 44, the expander 42, the ESD simulator 32' (including the table decryptor 46'), and the user data encryption and decryption engines 30, 30'. It is therefore preferable to implement each of these components at least in-part either in pseudocode or in obfuscated machine code. In general, only one of these two techniques (pseudocode or obfuscation) will be used to hide the details of a given software function, although both techniques may be (and preferably are) used within the same application.

V. The Pseudocode Layer

As indicated above, the Pseudocode Layer makes use of pseudocode to implement one or more of the copy protection functions of the application. The pseudocode is preferably in the form of binary machine code for a non-existent processor or machine.

As part of the pseudocode layer technique, the details of the pseudocode instruction set (including the opcodes and instruction formats) are maintained in secrecy by the software developer. An important benefit to using such pseudocode is that no publicly-available debuggers, disassemblers, or other software development tools exist for analyzing the pseudocode. This makes it extremely difficult for pirates to analyze the functions performed by the pseudocode. As an enhancement to this method, the pseudocode is preferably stored within the application in an encrypted form.

Although the pseudocode is preferably in the language of a non-existent processor, it may alternatively be in the language of an existing processor other than that of the platform to which the application has been ported. For example, a Macintosh application may be provided with pseudocode (and an associated interpreter) for a PDP-11 processor. This would have the advantage of allowing the developer to test and debug the pseudocode on an existing machine. The drawback to this approach is that a pirate could potentially identify the processor to which the pseudocode corresponds, and use this information (and any publicly-available development tools) to evaluate the pseudocode's operation.

Figure 4:
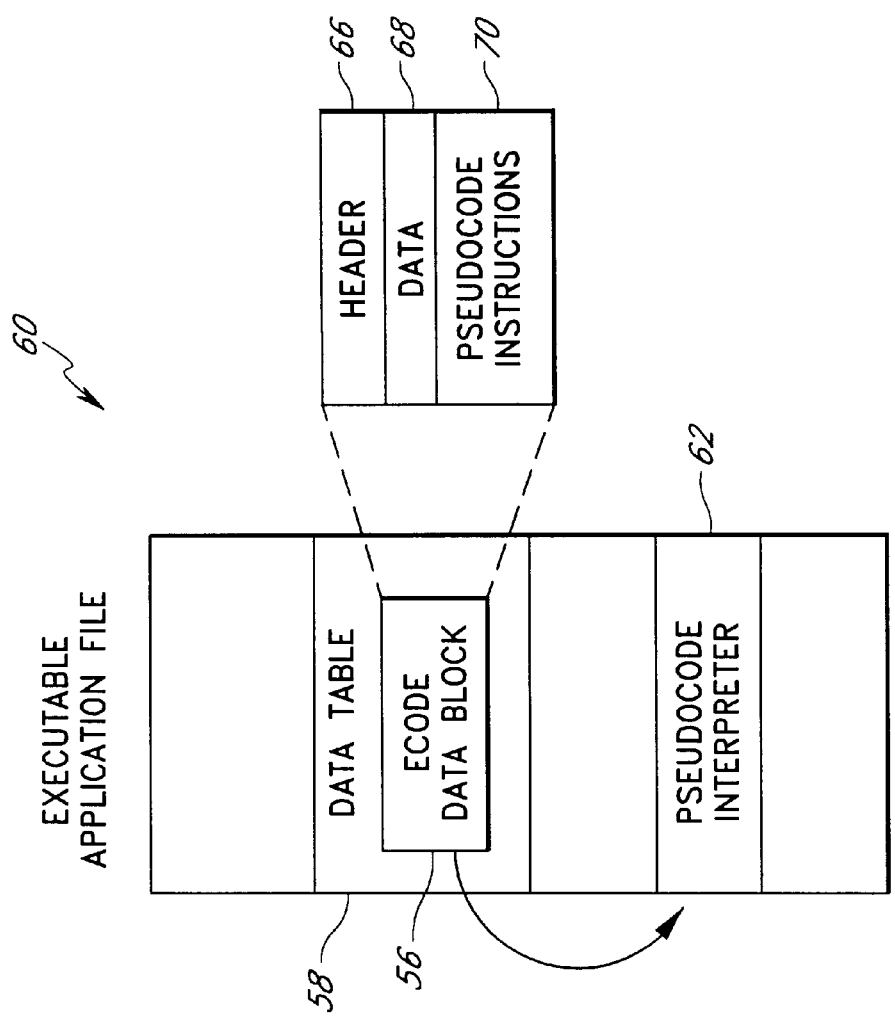
FIG. 4 illustrates an application file that includes encrypted pseudocode, and includes a pseudocode interpreter that reads and processes the encrypted pseudocode.

As illustrated in FIG. 4, the pseudocode for performing a given function (or possibly multiple functions) is preferably stored as an encrypted pseudocode ("ECODE") data block 56 within a data table 58 of the executable application file 60. Because the pseudocode is stored within a data table, the pseudocode appears to the pirate simply as part of the application's data, and does not impair the operation of the pirate's disassembler or other analysis tool. The application file 60 also includes a self-contained pseudocode interpreter 62 that decrypts and processes the ECODE data block to "execute" the functions encoded therein. In a preferred implementation which is described in detail below, the interpreter emulates a non-existent 32-bit CPU (central processing unit).

As depicted in FIG. 4, the ECODE data block 56 preferably includes a header 66, any data 68 that is needed by the pseudocode, and the pseudocode instructions, all of which are stored in encrypted, binary form. The header includes information that is used by the interpreter 63 to process the ECODE data block 56, including an initial program counter setting of the emulated CPU, information about the arguments to be passed, and key information for decrypting the instructions 70. Although the ECODE data block 56 is preferably stored as a data table, the information contained within the data block could be stored in any of a variety of forms, including separate files and application resources.

Although a single ECODE data block 56 is depicted in FIG. 4, the application file 60 can include multiple ECODE data blocks, each of which may be stored as a separate data table. For example, to implement the copy protection scheme of FIGS. 3A and 3B, separate ECODE data blocks may be provided for the condenser 44, the expander 42, the ESD simulator 32' (including the table decryptor 46'), the encryption engine 30, and the decryption engine 30'.

Some of the regular (non-copy-protection) functions of the application may also be implemented in pseudocode. This makes it more difficult for the pirate to identify and reverse engineer the code sequences that are used for copy protection. For example, a pirate may spend a considerable amount of time reverse engineering a pseudocode block only to find out that the function performed by the block is unrelated to copy protection.

Another variation involves intermingling copy protection and non-copy-protection functions within a single ECODE data block. For example, a single ECODE data code block can be provided that both encrypts user data (a copy-protection function) and writes non-encrypted user data to memory (a non-copy-protection function). This technique makes it considerably more difficult for the pirate remove or otherwise bypass the copy protection code, since bypassing the ECODE data block would cause another function of the application to fail. The non-copy-protection function may be a basic function that is necessary to the operation of the application, so that removal of the ECODE data block produces an inoperative application. Alternatively, a non-copy-protection function can be used which, when removed (by removal of the ECODE block), merely causes the application to produce minor or occasional incorrect results. This later approach makes it more difficult for the pirate to determine whether the application has been successfully cracked.

A function that is implemented in pseudocode may be invoked by another application function by calling the interpreter 62 and passing to the interpreter a pointer to the ECODE data block to be processed. One or more arguments may be passed to the interpreter as well. For example, if the ECODE data block implements the encryption engine 30 of FIG. 3A, the calling function may pass to the interpreter the 64-bit key value and a pointer to the block of user data to be encrypted.

As indicated above, the pseudocode used to implement a given function is preferably generated by the software developer using one of two methods. These two methods are illustrated in FIGS. 5 and 6, in which solid blocks represent development tools and dashed blocks represent components of the application being developed. As illustrated by FIG. 5, the first method involves hand-coding the function using a special assembly language that corresponds to the pseudo-processor (i.e., the processor emulated by the interpreter 62). The hand-coded assembly 80 is then processed using a special pseudocode assembler 82 to generate the ECODE data block 56. A specific implementation of the assembler 82 is described below. The step of encrypting the data block can alternatively be performed after the assembly process using a separate encryption utility.

The second method involves coding the function using a high-level language, and then using a special encrypting compiler 86 to convert the high-level code 88 into the ECODE data block 56. This method has the advantage of enabling the software developer to generate the pseudocode without the need to learn a special language. As with the first method, the data block can alternatively be performed after the compilation process using a separate encryption utility.

As indicated above, the assembler 82 and the encrypting compiler 86 can be maintained as confidential, internal development tools of the software developer to avoid exposing the implementation details of the pseudocode to potential pirates. Alternatively, these tools (and the interpreter 62) can be written such that software developers can freely modify the details (opcodes, instruction formats, encryption methods, etc.) of the pseudocode so that the tools can be made publicly available.

After the ECODE data block 56 has been generated (by either method), it is compiled together with the application's source code to imbed the ECODE as a data table.

As will be apparent from the foregoing, the use of pseudocode as described above provides a highly effective technique for hiding the implementation details of any software-based copy protection scheme. In order to analyze the functions that are coded in pseudocode, the pirate would normally have to disassemble and analyze the pseudocode interpreter 62, and then use the results of this process to write a disassembler for the pseudocode. At a minimum, it is believed that this would significantly increase the amount of time that it would take for a pirate to disable the copy protection scheme.

In addition, even if a pirate successfully develops a pseudocode disassembler, the software developer can make minor changes to the pseudocode implementation (such as by changing the encryption method used to encrypt the pseudocode instructions, or changing instruction formats) to make the disassembler obsolete. The pirate would then have to repeat the process of analyzing the interpreter and writing a new disassembler.

As indicated above, the level of concealment provided by the Pseudocode Layer can be further increased by appropriately combining the Pseudocode and Obfuscation Layer methods. One such combination involves implementing selected functions of the interpreter through obfuscated machine code, so that the interpreter will be more difficult to reverse engineer. Another combination involves including an obfuscation tool within the pseudocode generator (e.g., the encrypting assembler 82 or the encrypting compiler 86) to enable the developer to generate obfuscated pseudocode as an option.

Another enhancement involves using an interpreter that simulates a bit-slice processor. This would involve writing microcode for the various macroinstructions that are needed, together with software for implementing the arithmetic logic unit and other processor components. This would make the task of reverse engineering the interpreter more difficult, as the pirate would generally have to evaluate the operation of the interpreter at the microcode level. As a further level of the protection, the microcode could be encrypted.

The EASM (Encrypting Assembler)

A preferred implementation of the encrypting pseudocode assembler 82, referred to as the "EASM" (Encrypting Assembler), will now be described. The interpreter which corresponds to the EASM is referred to as the "SPEC" (Software Processor for Encrypted Code). The SPEC emulates a 32-bit decrypting CPU which includes 16, 32-bit general purpose registers. The operation of the SPEC is described separately below.

Figure 7:
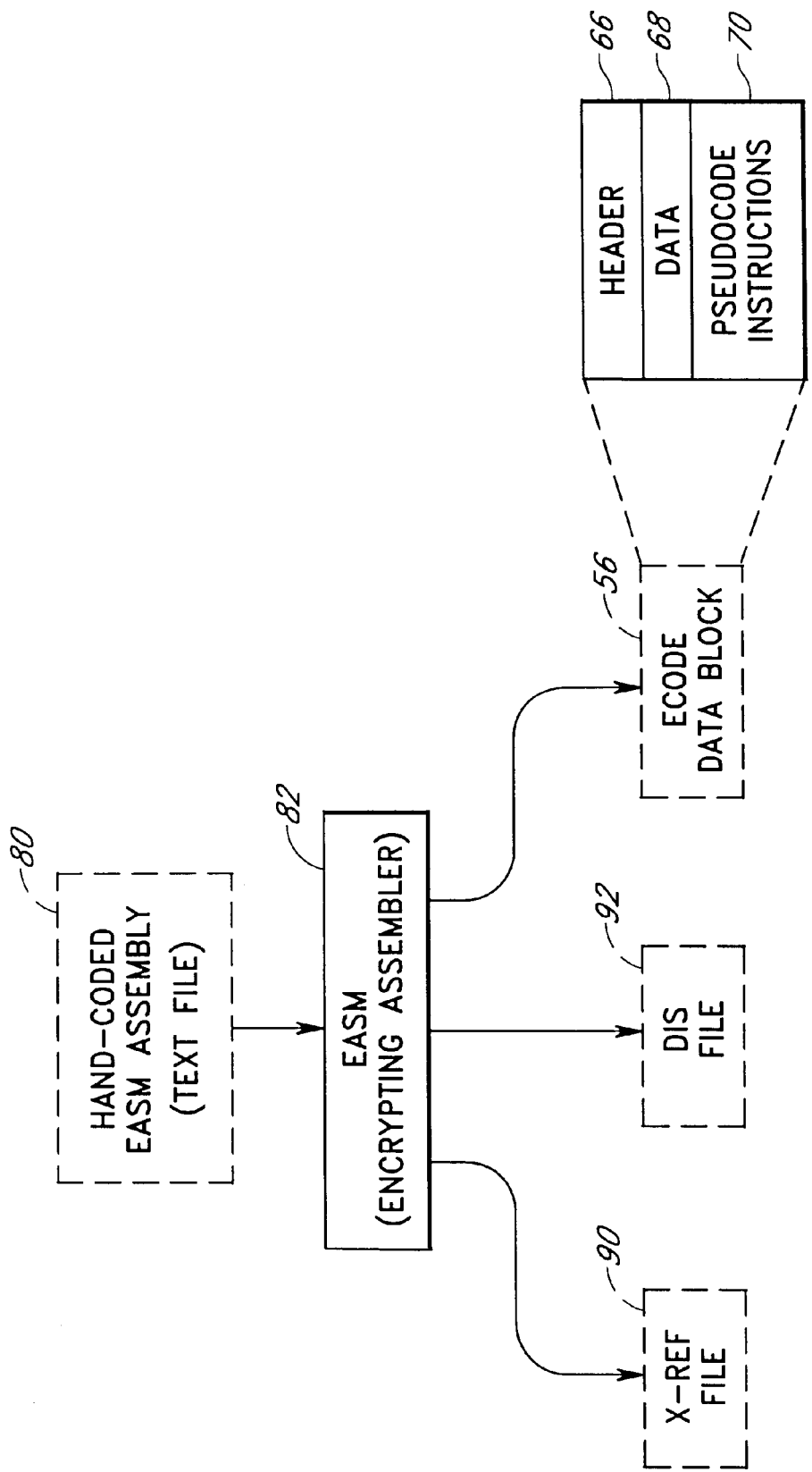
FIG. 7 is a flow diagram which illustrates the input and the outputs of an encrypting assembler.

As depicted in FIG. 7, the EASM assembler 82 receives as its input a text file 80 which contains assembly code written in the EASM assembly language. The instruction set of the EASM assembly language consists of 59 instructions, including 6 jump instructions, 6 branch instructions, 25 mathematical instructions, 4 logic instructions, 8 load/store instructions, 5 executive instructions, and a NOP instruction.

The executive instructions are used to handle special cases relating to the supervisory control of the SPEC. For example, an EXIT instruction is used to instruct the SPEC to exit from the ECODE data block 56, and enables an optional value to be returned to the function that called the SPEC. The EXEC instruction instructs the SPEC to call an external function; two optional arguments can be passed to the external function, and a return value is placed into a SPEC register. Other executive instructions are included for debug purposes.

With further reference to FIG. 7, the outputs of the EASM are an X-REF (cross reference) file 90, a DIS (disassembly) file 92, and the ECODE data block 56. The X-REF and DIS files 90, 92 are used for debug purposes. The X-REF file includes a listing of label values, and the DIS file includes a disassembly of the entire code block with line numbers. The header 66 of the ECODE data block is encrypted by the EASM separately from the data and code portions 68, 70, and contains a key that is used by the SPEC to decrypt these portions. In one implementation, the EASM generates the key automatically based on the current time-of-day. As described below, the EASM uses an encryption technique in which each pseudocode instruction or data line is encrypted based on both the location (address) of the line in the table and a key value stored in the header 66.

Figure 8:
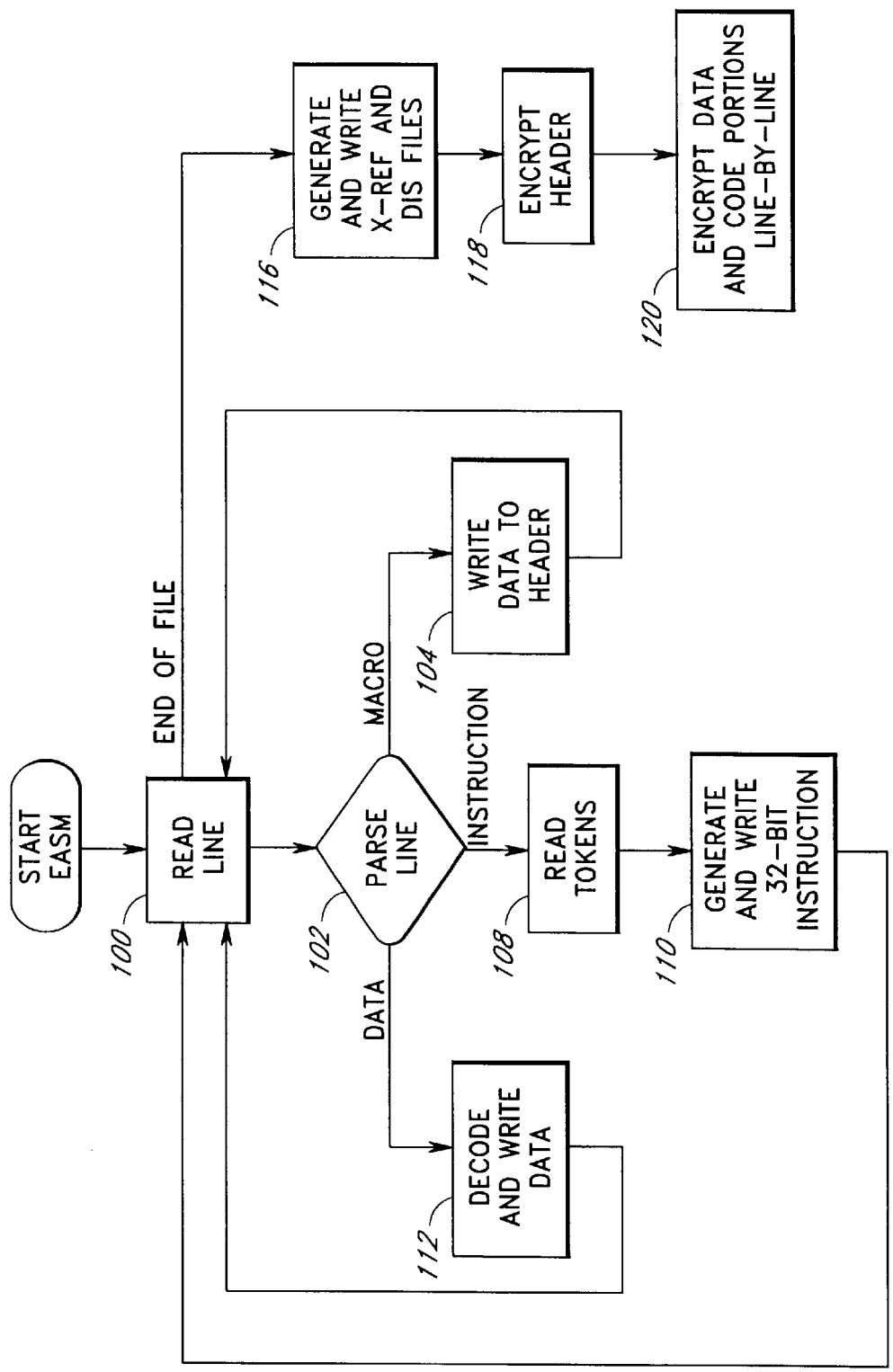
FIG. 8 is a flow diagram which illustrates the general operation of the encrypting assembler of FIG. 7.

FIG. 8 is a flow chart which illustrates the basic operation of the EASM. As illustrated by the flow chart, the EASM operates generally by reading one line of the text file (block 100), parsing the line (block 102), processing the parsed line to add data to a set of lists (header, data and code) that eventually become the ECODE data block (blocks 104–112), and then reading the next line of the file (block 100). After all of the lines of the text file have been processed, the EASM merges and encrypts the header, data and code lists (blocks 118 and 120) to generate the ECODE data block 56.

Each line of the text file consists of either a macro, an instruction, or data. The macros are used to generate the header 66, and are thus used by the developer to specify such things as the number of arguments, the initial program counter setting, and the key value for encrypting the data and instructions. As depicted by block 104, when one of the four built-in macros of the EASM is encountered, the EASM updates a header list and then loops back to read the next line.

As depicted by blocks 108 and 110, if the EASM detects that the line includes an instruction, the EASM's line parser generates a sequence of numeric tokens (3 for most instructions), each of which represents an element (label, instruction type, operand, etc.) of the instruction line. The tokens are then used to build a pseudocode instruction. Each pseudocode instruction consists of 32 bits. The pseudocode instructions fall into five instruction format categories. For each such category, the EASM has a corresponding internal mapping macro that specifies how the opcode, operand(s)

and any other bit fields are to be arranged within the 32-bit instruction value.

To build a 32-bit instruction from a sequence of tokens, the EASM makes use of a token reader (not shown) that accesses an internal data structure (not shown). The EASM's token reader can read signed and unsigned data at different bit depths, and can decode labels, registers, decimal values, hex values and octal values. The internal data structure defines the instruction set of the EASM, and specifies which of the five instruction formats is to be used to encode the assembly language instruction into a 32-bit pseudocode instruction. This data structure can be freely modified by the software developer to add and remove instructions and to change instruction formats. To add a new instruction to the EASM, the developer adds to this data structure a line which specifies the following: a text name of the instruction, a numeric opcode value, one of the five instruction formats (specified by a mapping macro), whether or not the instruction is immediate, and whether the operand is signed or unsigned. A similar data structure is used by the SPEC to process the instructions.

As the sequence of tokens for a given line is read, the token reader matches the opcode to the corresponding instruction in the internal data structure to determine the instruction format and sign information. The token reader then parses the tokens, and maps the tokens (using the mapping macros) into the 32-bit pseudocode instruction. The pseudocode instruction is then written (in unencrypted form) to an instruction list which eventually becomes part of the ECODE data block.

With reference to block 112, if the line consists of a data value, the data value is decoded and written into a DATA list.

Once the last line of the text file has been processed, the EASM generates and writes the X-REF and DIS files (block 116), and concatenates the header, data and instruction lists to form a single ECODE list (not shown). The EASM then encrypts the header portion of the EASM list using a header encryption algorithm (block 118), and then encrypts the data and code portions line-by-line using an instruction encryption algorithm. These encryption algorithms can be specified by the developer from EASM's user interface.

As described below, the SPEC decrypts and executes the instructions line-by-line. It is therefore desirable to use a relatively simple encryption algorithm to encrypt the instructions and data, since the use of a more complex algorithm would reduce instruction throughput. The algorithm used for this purpose is preferably a simple XOR algorithm that uses a key value stored in the header 66 and the position of the data/instruction line in the ECODE list. As indicated above, the key value is generated automatically by the EASM. The header is preferably encrypted using a stronger encryption scheme such as DES. Because the header is only decrypted at the outset (as described below), the use of a stronger encryption algorithm for this purpose does not affect instruction throughput.

Once the ECODE block has been generated, the developer can cut and paste the block into an application source code file.

The SPEC (Software Processor for Encrypted Code)

As indicated above, the SPEC is a self-contained interpreter that emulates a 32-bit CPU in software. The SPEC is imbedded within the application to be protected, and is designed to decrypt and execute pseudocode instructions that were generated by the EASM. As with the EASM, the instruction set of the SPEC can be changed by simple modification to an internal data structure. The SPEC has no stack or other methods for memory allocation. A program counter (PC) of the SPEC references the line number (within the ECODE data block) of the instruction being processed.

One feature of the SPEC is that it can write to the computer's local memory to access both data and instructions. This allows self-modifying pseudocode to be used as an option. It is possible to overwrite the pseudocode instructions in Macintosh implementations since the instructions are executed out of the data cache of the Power PC or other microprocessor. The use of self-modifying code makes it more difficult for pirates to analyze the operation of the pseudocode.

Another feature of the SPEC is that it supports recursion (i.e., the ability of a routine to call itself). Specifically, one SPEC function (a function implemented in SPEC pseudocode) can call itself or another SPEC function. As with self-modifying code, this feature can be used by software developers to further obscure the details of the copy protection scheme.

In operation, the SPEC decrypts and processes an ECODE data block (generated by the EASM) that is stored in the computer's local memory. The location of the ECODE block is passed to the SPEC by the calling function via a pointer. The ECODE data block needs to reside in a modifiable partition if writing to local memory is required. Arguments can optionally be passed with the pointer, and have the effect of pre-loading SPEC registers. Arguments can represent pointers or numerical operands.

Figure 9:
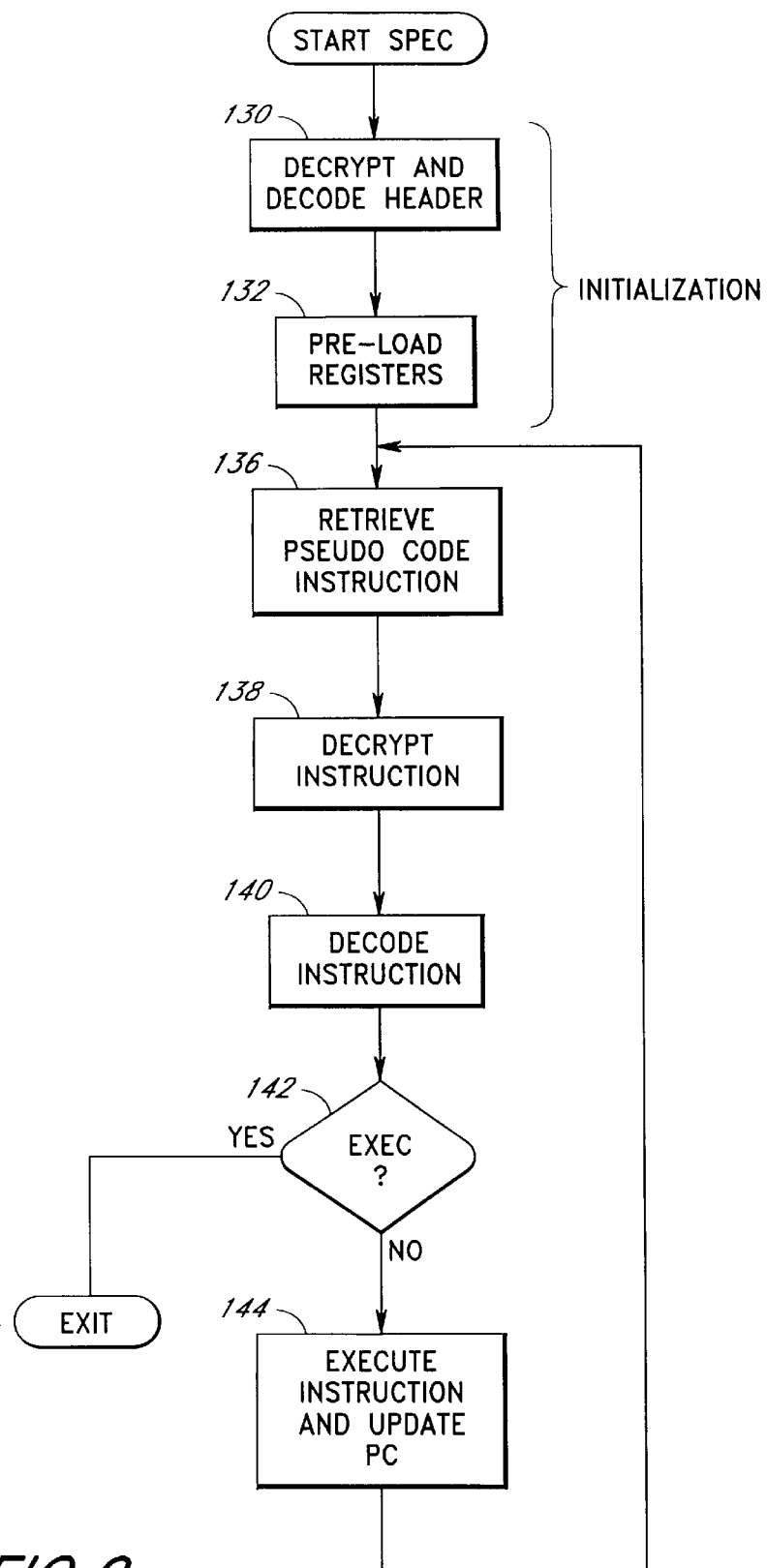
FIG. 9 is a flow chart which illustrates the general operation of an interpreter which process encrypted pseudocode.

FIG. 9 illustrates the operation of the SPEC in further detail. When an ECODE data block is passed to the SPEC, the SPEC initially decrypts the header (block 130) to extract the initial PC setting, the number of arguments, and the key for decrypting data and instructions. Once the header has been decoded, the SPEC loads the registers (block 132) with any arguments and loads the PC with the line number of the first instruction to be fetched and executed. The SPEC then enters into a main fetch/execution loop (blocks 136–144).

Within the execution loop, the SPEC retrieves one pseudocode instruction (block 136) at-a-time using the PC as an offset into the ECODE block. Once an instruction has been retrieved, the instruction is decrypted (block 138) using the PC value and the key extracted from the header. Pseudocode instructions can also be fetched from outside the ECODE data block (using direct addressing instructions), in which case the decryption step is bypassed.

As depicted by block 140, the SPEC uses its internal data structure to decode the pseudocode instruction. If the instruction is an EXEC instruction (block 142), the SPEC exits from the main fetch/execution loop for special processing. Otherwise, the SPEC executes the instruction and updates the PC (block 144). If the instruction involves a retrieval of data from the ECODE data block 56, the data is decrypted using the same location-based method used to decrypt instructions. Likewise, if the instruction requires data to be written to the ECODE data block, this data is initially encrypted using the location based-method. If the instruction calls for data to be read from or written to an area of memory outside the ECODE data block (which is possible when direct addressing is used), no encryption or decryption of the data is performed.

For all instructions other than branch and jump instructions, the PC is incremented by one to point to the next line of the ECODE data block. For branch and jump instructions, the PC is loaded with an immediate value specified within the instruction.

VI. The Obfuscation Layer

As indicated above, the Obfuscation Layer hides the implementation details of selected copy protection or other software functions by implementing such functions using unnecessarily large amounts of highly-inefficient (and thus obfuscated) machine-level code. This technique makes it more difficult for pirates to analyze such functions using conventional disassembly and debugging techniques. The obfuscated code is generated using an obfuscation tool which converts blocks of code into larger blocks of less efficient code under the control of the software developer. In one embodiment (described below), the obfuscation tool is in the form of a de-optimizing cross-compiler for the C programming language. In another embodiment, the obfuscation tool operates generally as a de-optimizing cross-assembler that converts a block of assembly code into a larger block of assembly code.

As indicated above, the Obfuscation Layer is preferably combined with the Encryption Layer by implementing one or more of the following Encryption Layer components (all shown in FIGS. 3A and 3B), or portions thereof, in obfuscated code: the condenser 44, the expander 42, the ESD simulator 32' (including the table decryptor 46'), the encryption engine 30, and the decryption engine 30'. As with the Pseudocode Layer, the level of copy protection provided by the Obfuscation Layer can be increased by intermingling copy-protection and non-copy protection functions within a single, callable block of obfuscated code.

By way of background, it is known in the art of programming to use a code obfuscator program ("code obfuscator") to translate high-level source code into high-level source code that is more difficult to read. This is typically done (for non-copy-protection purposes) when a software developer desires to provide its high-level application code to an outside entity to allow the entity to port the application to a specific hardware platform. To avoid unnecessarily exposing the algorithms and other implementation details of the application to the outside entity, the software developer uses the code obfuscator to generate an obfuscated (less-human-readable) version of the high-level source code, and provides only the obfuscated version to the outside entity.

Code obfuscators that are used for this purpose (exposing high-level source code to outsiders) operate by performing such tasks as replacing names of variables with arbitrarily-assigned character sequences, and merging multiple functions into larger blocks of code. Importantly, when the obfuscated source code is compiled, the resulting machine code is substantially the same in length and complexity as the machine code that would be produced from the non-obfuscated source code. Thus, unlike the obfuscation tool of the present invention, conventional code obfuscators of this type do not make the task of analyzing the operation of the machine code substantially more difficult.

Figure 10:
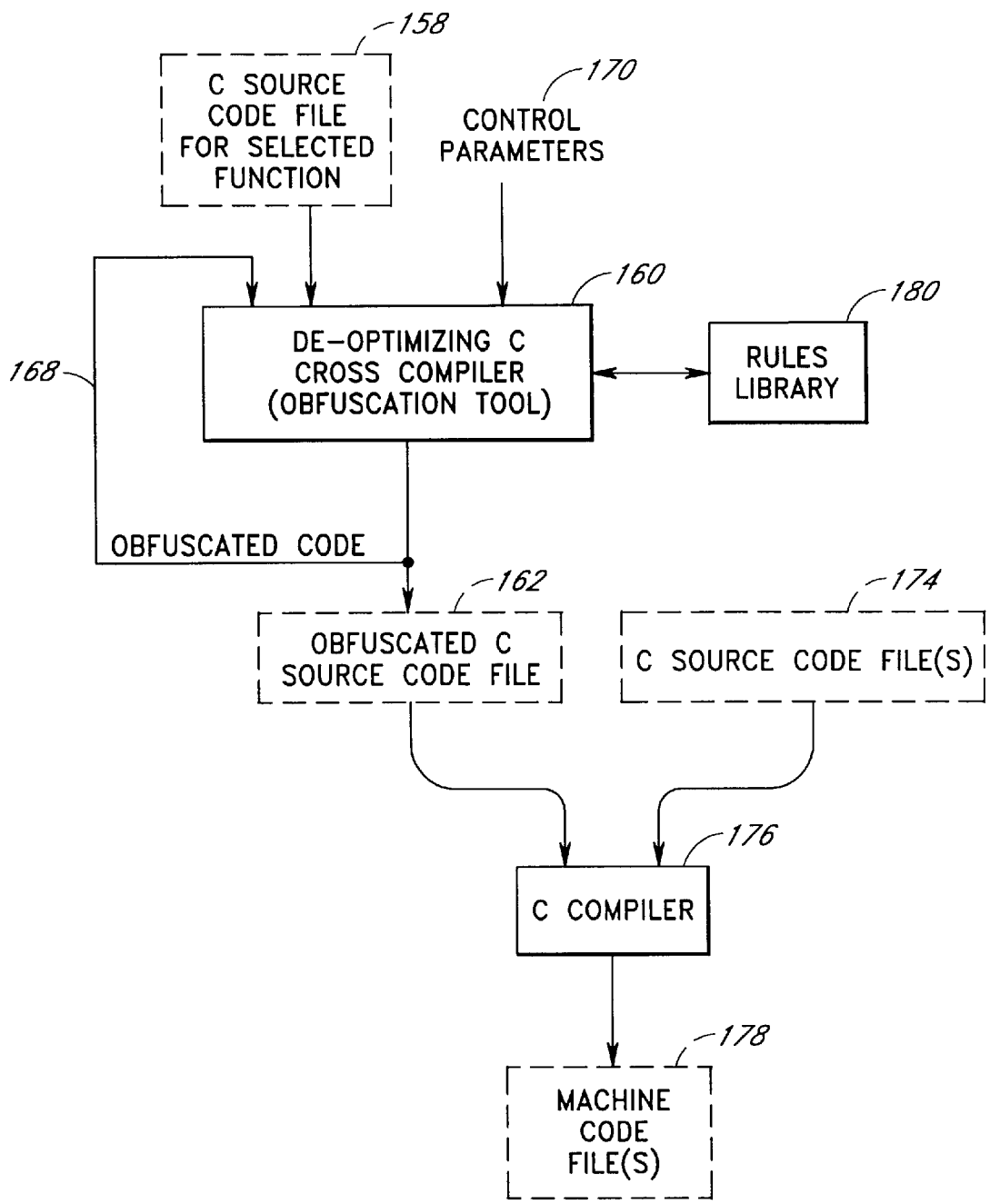
FIG. 10 is a flow diagram which illustrates a preferred development process for implementing an application function in obfuscated machine code.
Figure 11:
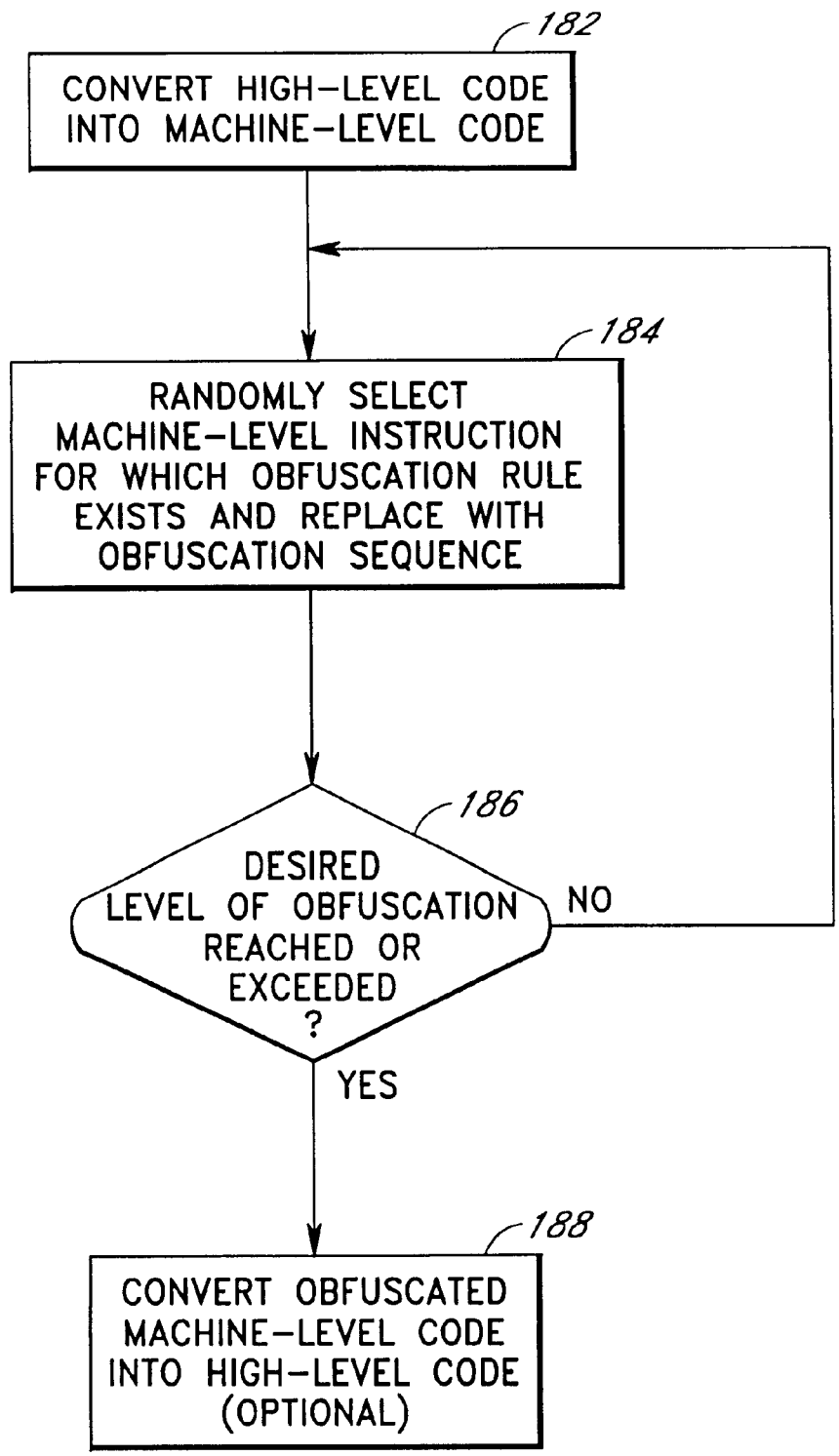
FIG. 11 is a flow chart which illustrates, in accordance with one embodiment of the invention, the operation of the de-optimizing cross-compiler of FIG. 10.

FIGS. 10 and 11 illustrate a preferred development process for applying the Obfuscation Layer technique to a selected function (or set of functions) of an application. Solid blocks in FIGS. 10 and 11 represent tools that are used by the developer, and dashed blocks represent components of the application being developed. As depicted by FIG. 10, the function is initially manually coded in C to generate a C source code file 158. This function may, for example, include code for implementing multiple smaller functions, such as a combination of copy-protection and non-copy protection functions that are intertwined.

The C source code file 158 is then processed using a special de-optimizing cross-compiler 160 (the obfuscation tool) to generate an obfuscated C source code file 162. In one implementation, the special cross-compiler 160 recognizes only a simplified version of the C programming language, and this simplified version is used to manually code the function.

In other embodiments of the invention, the obfuscation tool 160 may, for example, output obfuscated machine-level code (which may optionally be in a pseudocode language), or may output obfuscated code in a different high-level language. Further, the obfuscation tool 160 may be configured to accept a machine-level input file in place of the C source code file 158.

The cross-compiler 160 preferably generates the obfuscated C code by converting pre-specified types of operations (additions, multiplications, logical operations, moves, etc.) into larger numbers of constituent operations. As described below, this task may be performed at the machine level (as in the example provided below), at a higher level (such as the C level), or both. The process of translating individual operations into larger numbers of operations is governed by a set of obfuscation rules that are stored in a rules library 180. For example, the mapping library 180 may contain a rule that specifies that the operation C=A+B is to be converted into the sequence C=2A, B=2B, C=(C+B)/2. An example set of obfuscation rules for generating obfuscated code at the machine level are provided in the example below.

The cross-compiler 160 also preferably generates tables that store input variables, temporary variables, constants, and other entities that are used by the obfuscated code, and imbeds these tables within the obfuscated source code file 162.

In a preferred embodiment of the obfuscation tool 160, the software developer can define the obfuscation rules that are to be used during the obfuscation process, and/or select a set of obfuscation rules from a larger library of rules. This feature is useful, for example, for allowing the developer to modify the obfuscation process each time a new version of the application is generated. A similar result can be achieved, for example, by providing an obfuscation tool 160 that selects the rules to be applied at random, and/or selects the rules based on the input of the developer. This ability of the developer to control the obfuscation process by directly or indirectly specifying the obfuscation rules to be used makes it practical for many different software companies to use the same or similar obfuscation tools 160.

As depicted by the feedback path 168 in FIG. 10, the obfuscation process may be re-applied to the obfuscated code any number of times to generate the desired amount of obfuscated code. For example, once the entire C source code file 158 has been processed to produce a block of obfuscated code, this block of obfuscated code can be processed a second time to generate the obfuscated C source code file 162. Any of a variety of techniques can be used to control the level of obfuscation.

In a preferred embodiment of the obfuscation tool 160, the developer can control the amount of code that is ultimately generated (and thus the obfuscation level) via a set of input parameters 170. The cross-compiler 160 then continues the obfuscation process (over multiple iterations if necessary) until the target obfuscation level is reached. In one embodiment, for example, the developer specifies the target obfuscation level as a multiple of the original number of instructions. For example, if an obfuscation level of 100 is specified, the obfuscation tool 160 generates an output file 162 having an instruction count that is at least 100 times the instruction count of the input file 158. In other implementations, the developer may, for example, specify the quantity of machine-level code to be generated, or simply specify the number of iterations to be performed before outputting the obfuscated code file 162.

With further reference to FIG. 10, the obfuscated C source code file 162 (and any other such files that may be generated by the same process) is compiled together with the other application source code files 174 (using a regular C compiler 176) to generate the application's machine code file(s) 178. During this process, the obfuscated C source code is translated into a proportional quantity of obfuscated machine code. Thus, the obfuscation at the C level translates into obfuscation at the machine level. The obfuscated functions are called during the execution of the application in the same manner as are non-obfuscated functions.

FIG. 11 is a flow chart which illustrates one method that may be used by the de-optimizing cross compiler 160 or other obfuscation tool to generate the obfuscated code. In this example implementation, individual instructions are translated into longer, equivalent sequences of instructions (referred to herein as "obfuscation sequences") at the machine level. In addition, only one machine-level instruction is processed per iteration, and this machine-level instruction is selected at random. As will be apparent to those skilled in the art, numerous variations of the FIG. 11 method are possible.

As depicted by block 182 of FIG. 11, the high-level C code of the input file 158 is initially converted into machine-level code. The machine-level code may be in either machine code or assembly code form, and may be in the language of either an existing or a non-existing processor. As depicted by block 184, during each iteration of the process, a machine-level instruction for which an obfuscation rule exists is selected at random, and the instruction is replaced with the corresponding obfuscation sequence defined by the rule. In one embodiment, if multiple rules exist for the same instruction, the obfuscation tool 160 selects one of the multiple rules at random.

As depicted by decision block 186, the obfuscation tool 160 determines, after each iteration, whether the desired level of obfuscation has been reached or exceeded. This may be accomplished, for example, by comparing the number of lines of code of a temporary output code structure to the number of lines of machine code generated in step 182. If the desired level has not yet been reached, the process of randomly selecting and replacing a machine-level instruction is repeated.

As depicted by block 188, once the desired obfuscation level has been reached, the resulting (obfuscated) machine-level code is preferably converted back to high-level code. This step is performed so that the resulting obfuscated code can be ported to multiple different hardware platforms. Alternatively, this step can be omitted, and the obfuscated machine-level code can simply be imbedded or compiled into the application—either as "regular" machine code, or as pseudocode to be processed by an imbedded interpreter.

Obfuscation Example

To illustrate the operation of an obfuscation tool 160 which operates generally as depicted in FIG. 11, an example will now be provided in which a simple C function is obfuscated using a set of machine-level obfuscation rules for a pseudocode language. In this example, it is assumed that the software developer has specified an obfuscation level of 10, and that the obfuscation level is defined as a multiple of the initial number of machine-level instructions.

The assembly language instructions and syntax used in this example are outlined in Table 1. The set of rules that are used are set forth in Table 2, in which the following macros are used:

FRn—Generate an unused floating point register
FCn—Generate a floating point constant In this example, two different rules (rules 2 and 3) are defined for the instruction add a, b, and these two alternative rules are selected by the obfuscation tool 160 at random.

TABLE 1

ASSEMBLY INSTRUCTIONS AND SYNTAX

| Pneumonic | Description |
|---|---|
| NAME (r0, r1,. . . rn) | Declare a function name with its list of parameters |
| add a, b | Add constant or register a to constant or register b |
| sub a, b | Subtract constant or register a from constant or register b |
| mul a, b | Multiply constant or register a with constant or register b |
| ret a | Return from function with the result in register a |
| mov a, b | Move contents of register a to register b |

TABLE 2

OBFUSCATION RULES

| Rule | Instruction to be replaced | Obfuscation sequence |
|---|---|---|
| 1 | mov a, b | mov b, FR0<br>add a, b<br>sub FR0, b |
| 2 | add a, b | mov FR0, FR1<br>add a, FR0<br>sub FR1, b<br>add FR0, b |
| 3 | add a, b | sub FC0 + FC1, b<br>add a, b<br>add FC0, b<br>add FC1, b |
| 4 | sub a, b | move FR0, FR1<br>sub a, FR0<br>add b, FR1<br>sub FR0, FR1<br>mov FR1, b |
| 5 | mul a, b | move FC0, FR0<br>add a, FR0<br>add FC1, FR0<br>mov b, FR1<br>mul FC0 + FC1, FR1<br>mul FR0, b<br>sub FR1, b |

The following C code is used in this example as the input function to be obfuscated:

float function foo(a,b,c)
{
    return a*b+c;
}

The assembly code for the this function is as follows:

| foo(f0, f1, f2): | ;(a, b, c) |
| mul f1, f0 | ;a = a * b |
| add f2, f0 | ;a = a + c |
| ret f0 | |

The initial function contains two machine-level instructions, not including the function declaration and return. In operation, the obfuscation rules are applied repeatedly to the function's instructions until the target obfuscation level is reached. As in the FIG. 11 implementation, one instruction is replaced (converted to an equivalent obfuscation sequence) per iteration, and the instructions are selected for replacement at random. The function's assembly code following each iteration of the process is shown in Table 3, together with the rule applied during the iteration and the obfuscation level following the iteration. In each of the first five columns in Table 3, the instruction marked with an asterisk is the instruction randomly selected for replacement in the following iteration.

After iteration 5, the obfuscation level is 20/2=10, and the obfuscation process is complete. The final code now bears virtually no resemblance to the original pair of instructions. If this process were repeated until an obfuscation level of 10,000, for example, were reached (resulting in approximately 20,000 instructions), the task of examining the code to determine the function's purpose and operation would be extremely difficult. With modern processors, copy protection code that has been obfuscated to such a level can still be sufficiently efficient.

TABLE 3

| Initial Code | Iteration 1 (Rule 5) | Iteration 2 (Rule 1) | Iteration 3 (Rule 2) | Iteration 4 (Rule 3) | Iteration 5 (Rule 4) |
|---|---|---|---|---|---|
| mul f1, f0* | mov 5, f3 | mov 5, f3 | mov 5, f3 | mov 5, f3 | mov 5, f3 |
| add f2, f0 | add f1, f3 | add f1, f3* | mov f4, f5 | mov f4, f5 | mov f4, f5 |
|  | add 37, f3 | add 37, f3 | add f1, f4 | add f1, f4 | add f1, f4 |
|  | mov f0, f4* | mov f4, f5 | sub f5, f3 | sub f5, f3 | sub f5, f3 |
|  | mul 42, f4 | add f0, f4 | add f4, f3 | add f4, f3 | add f4, f3 |
|  | mul f3, f0 | sub f5, f4 | add 37, f3 | add 37, f3 | add 37, f3 |
|  | sub f4, f0 | mul 42, f4 | mov f4, f5 | mov f4, f5 | mov f4, f5 |
|  | add f2, f0 | mul f3, f0 | add f0, f4 | add f0, f4 | add f0, f4 |
|  |  | sub f4, f0 | sub f5, f4 | sub f5, f4* | mov f6, f7 |
|  |  | add f2, f0 | mul 42, f4 | mul 42, f4 | sub f5, f6 |
|  |  |  | mul f3, f0 | mul f3, f0 | add f4, f7 |
|  |  |  | sub f4, f0 | sub f4, f0 | sub f6, f7 |
|  |  |  | add f2, f0* | sub 11, f0 | mov f7, f4 |
|  |  |  |  | add f2, f0 | mul 42, f4 |
|  |  |  |  | add 3, f0 | mul f3, f0 |
|  |  |  |  | add 8, f0 | sub f4, f0 |
|  |  |  |  |  | sub 11, f0 |
|  |  |  |  |  | add f2, f0 |
|  |  |  |  |  | add 3, f0 |
|  |  |  |  |  | add 8, f0 |
| Obfuscation Level: 0 | Obfuscation Level: 4 | Obfuscation Level: 5.5 | Obfuscation Level: 7 | Obfuscation Level: 8.5 | Obfuscation Level: 10 |

*Instruction replaced on following iteration

As described above, the obfuscated machine-level code can be converted back into C (or another platform-independent language), or can be imbedded or compiled directly into the application without first being converted into a high-level language.

As will be appreciated by the foregoing, the general methodology used to replace machine-level instructions in the above example can also be used to replace instructions of a high-level code sequence. In addition, the technique can be used to obfuscate a function that has been hand-coded in an assembly language.

It will also be appreciated that other types of obfuscation rules could additionally or alternatively be used to increase the level of security provided by this technique. Examples of other types of obfuscation rules include the following (a) rules that store temporary data on the stack, (b) rules that reorder instructions which do not depend upon each other's registers, (c) rules that reorder code with unconditional branching structures, (d) rules that add conditional branching structures, (e) rules that add decoy instructions which operate upon unused registers, and (f) rules that randomize register numbers.

VII. License Management

Figure 12:
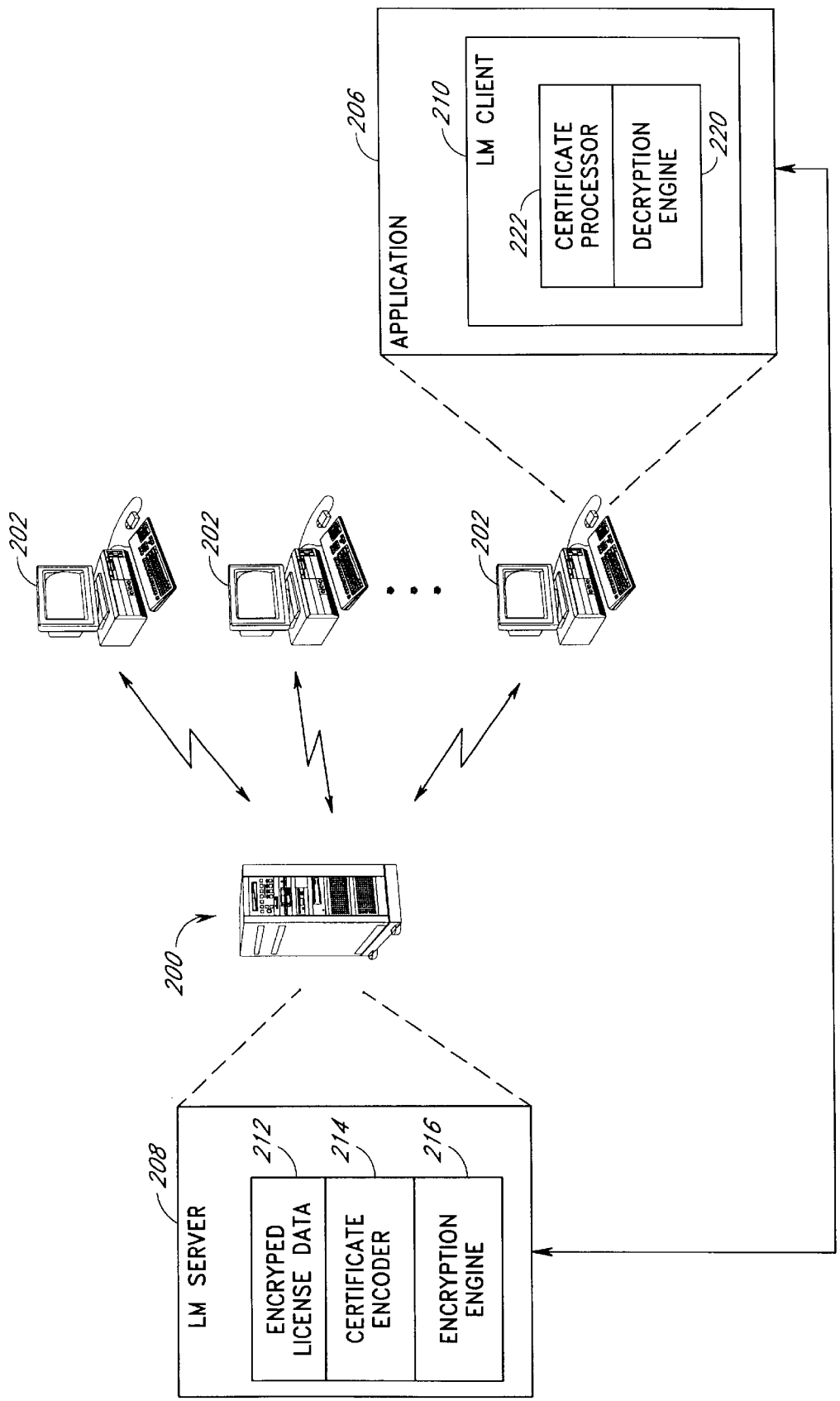
FIG. 12 illustrates a license management system in which the encryption, pseudocode and obfuscation techniques of the invention can be used to protect against security attacks.

The Encryption Layer, Pseudocode Layer and Obfuscation Layer techniques described above can also be used to protect conventional license management systems from attack. FIG. 12 illustrates a typical license management system in which the techniques of the present invention can be employed. Software components for building systems of this type are available from such companies as Globetrotter Software Inc. of Campbell Calif.

The system includes a central server 200 which communicates with multiple workstations 202 over a local or wide area network (not shown) to control the use of an application 206. Copies of the application 206 (one depicted in FIG. 12) are stored on the individual workstations 202 so that users of the workstations can selectively launch and run the application. In other implementations, the workstations 202 may, for example, be in the form of network computers that download copies of the application just prior to execution.

The server 200 runs a license management server program 208 ("LM server") that dispatches encrypted authorization certificates to the workstations 202 in response to requests generated by the application 206. These requests are generated by a license management client component 210 ("LM client") that is imbedded within the application code. Unless a valid authorization certificate has been dispatched to the LM client 210, the application 206 will remain in a locked (nonoperative) state on the workstation 202.

As illustrated in FIG. 12, the LM server 206 accesses encrypted license data 212 that specifies the rights of the licensee (typically a corporate organization) to use the application under a license arrangement. This data may, for example, be stored locally on the server 200 (or elsewhere on the network) as an encrypted file. The license rights specified by such data 212 normally include the number of application copies that are authorized to run concurrently on the network. Other license rights that may be specified include the application features that users are authorized to access, the expiration date of the application, and license rights with respect to other applications.

The LM server 208 also includes a certificate encoder 214 and an encryption engine 216. The certificate encoder 214 generates authorization certificates (blocks of encoded data) based on the encrypted license data 212. The encryption engine 216 encrypts these certificates before they are transmitted on the network. The LM client 210 includes a decryption engine 220 for decrypting the certificates, and includes a certificate processor 222 for decoding and processing the decrypted certificates. The certificate processor 222 also includes functionality for unlocking the application 206.

In operation, when a user launches a copy of the application on a workstation 202, the application comes up in the locked state. In response to the launching of the application, the LM client 210 on the workstation generates a request for an authorization certificate and sends the request to the LM server 208. The LM server 208 keeps track of the number of copies of the application that are currently running on the network, and dispatches a certificate to the requesting workstation 202 only when this number is below the maximum. In some implementations, the dispatched certificate specifies the particular application features that the user is authorized to use, and the application 206 uses this information to enable or disable specific features.

Upon receiving the authorization certificate at the workstation 202, the LM client 210 decrypts and decodes the certificate to ensure that the certificate is valid. If a valid certificate is received, the certificate processor 222 unlocks the application 206 on the workstation 202. When the user subsequently closes the application 206, the LM client 210 notifies the LM server 208 that the certificate is no longer in use. The LM server 208 may also poll or otherwise communicate with the application copies that have outstanding certificates to make sure each copy is still running (e.g., has not crashed).

Systems of the type described above can be attacked by hackers in a number of different ways. One way is to modify the application code to enable the application to run without a valid authorization certificate. Another method is to modify either the encrypted license data 212 or the executable code of the LM server 202 to cause the LM server to dispatch more certificates than the licensee has paid for. Yet another method is to write a program that emulates the operation of the LM server 208.

To protect against these and other forms of attack in accordance with the present invention, portions of the LM server and the application 206 are provided in pseudocode and/or obfuscated machine code (in the same manner as described above for standard copy protection) to hide the implementation details of the authorization scheme. Preferably, the code portions of the LM server 208 that are provided in pseudocode and/or obfuscated machine code include the following: the certificate encoder 214, the encryption engine 216, the code (not shown) used to decrypt and interpret the encrypted license data 212, and the code (not shown) used to poll the workstations 202. The code portions of the application 206 that are preferably provided in pseudocode or obfuscated machine code include the decryption engine 220, the certificate processor 222, and the code (not shown) that responds to polls from the LM server 208. If pseudocode is used within the LM server 208, the LM server will include an imbedded pseudocode interpreter; and if pseudocode is used within the application 206, the application will include an imbedded pseudocode interpreter.

ESDs can be used on the central server 200, the workstations 202, or both to further increase the level of security. One method is to use an ESD on the central server 200 to encrypt the authorization certificates (using code within the LM server 208), and to use ESD simulators on the workstations 202 to decrypt the certificates (using code within the application). This method is preferably implemented using the same process as shown in FIGS. 3A and 3B (with FIG. 3A representing the LM server process and FIG. 3B representing the application process), with the exception that the user data is replaced with the authorization certificate.

Although this invention has been described in terms of certain preferred embodiments, other embodiments that are apparent to those or ordinary skill in the art are S also within the scope of this invention. Accordingly, the scope of the present invention is intended to be defined only by reference to the appended claims.

What is claimed is:

1. A software application which runs in conjunction with an electronic security device (ESD), the application comprising, on a computer-readable medium:
    application code which provides application-level functionality to a user of the application;
    security code which implements an ESD-based use restriction scheme to protect against an unauthorized use of the application, at least a portion of the security code being in pseudocode; and
    an interpreter module which includes executable code for retrieving and executing the pseudocode.

2. The software application as in claim 1, wherein the pseudocode is stored within a data table of the application.

3. The software application as in claim 2, wherein the pseudocode is stored within the data table in an encrypted form.

4. The software application as in claim 1, wherein the pseudocode implements at least a portion of a decryption engine which decrypts data that is necessary to the proper operation of the application.

5. The software application as in claim 4, wherein the decryption engine decrypts the data using a value generated by at least one of an electronic security device (ESD) and a software-implemented ESD simulator.

6. The software application as in claim 5, wherein the decryption engine decrypts user data that has been encrypted using an encryption engine of the application, the user data generated by the application code in response to actions of the user.

7. The software application as in claim 5, wherein the decryption engine decrypts an authorization certificate that is dispatched over a network by a license management server.

8. The software application as in claim 7, wherein the certificate is encrypted by the license management server using a value generated by the ESD, and is decrypted by the application using a value that is generated by the ESD simulator.

9. The software application as in claim 1, wherein the pseudocode is in a machine-language of a non-existent processor.

10. The software application as in claim 1, wherein the interpreter module emulates a bit-slice processor.

11. The software application as in claim 1, wherein the application includes a pseudocode module which implements at least one copy-protection function and at least one non-copy-protection function.

12. The software application as in claim 11, wherein the copy-protection function and the non-copy-protection function are intermingled within the pseudocode module.

13. The software application as in claim 1, wherein the security code comprises obfuscated machine code, the obfuscated machine code generated using an obfuscation tool which increases a quantity of instructions within an input code module.

14. The software application as in claim 1, in combination with the ESD.

15. The software application as in claim 1, wherein the application code provides 3-D animation functionality.

16. A method of protecting a software application from unauthorized use, the method comprising:
    providing the application with a code module which communicates with an electronic security device (ESD), the ESD configured to generate and return numeric values in response to requests from the code module;

imbedding a pseudocode module within the application, the pseudocode module including pseudocode which implements at least one function of an ESD-based security method; and providing the application with an interpreter module, the interpreter module including code for fetching and executing instructions of the pseudocode module.

17. The method as in claim 16, wherein the step of imbedding comprises imbedding the pseudocode within a data table of the application.

18. The method as in claim 17, wherein the step of imbedding comprises imbedding the pseudocode within the data table in an encrypted form.

19. The method as in claim 16, wherein the pseudocode module implements at least one copy protection function and at least one non-copy-protection function.

20. The method as in claim 19, wherein the copy-protection function and the non-copy-protection function are intermingled within the pseudocode module.

21. The method as in claim 16, further comprising the step of processing at least one coded function of the ESD-based security method with an obfuscation tool to generate obfuscated code, and imbedding the obfuscated code within the application.

22. The method as in claim 21, wherein the step of processing the coded function comprises replacing individual instructions of the coded function with equivalent sequences of instructions to increase a quantity of instructions within the function.

23. The method as in claim 16, wherein the pseudocode module includes encrypted pseudocode, and the method further comprising generating the encrypted pseudocode using an encrypting compiler that converts high-level code into encrypted pseudocode.

24. The method as in claim 16, wherein the pseudocode module includes encrypted pseudocode, and the method further comprising generating the encrypted pseudocode using an encrypting pseudocode assembler that converts assembly code into encrypted pseudocode.

25. A software development kit for adding secure copy protection code to an application, the kit comprising:

a pseudocode interpreter module that is adapted to be added to an application and called by other modules of the application, the pseudocode interpreter module configured to decrypt and execute encrypted pseudocode that is imbedded within the application; and a development tool which generates the encrypted pseudocode from source code.

26. The software development kit as in claim 25, wherein the pseudocode interpreter retrieves the encrypted pseudocode from a data table of the application.

27. The software development kit as in claim 25, wherein the development tool generates a data block that is adapted to be imbedded as data within the application, the data block including the encrypted pseudocode, and including information that is used by the pseudocode interpreter module to decrypt the encrypted pseudocode.

28. The software development kit as in claim 25, wherein the development tool comprises an encrypting compiler which generates the encrypted pseudocode from high-level source code.

29. The software development kit as in claim 25, wherein the development tool includes a user interface which allows a developer to specify an encryption method to be used to generate the encrypted pseudocode.

30. The software development kit as in claim 25, wherein the pseudocode interpreter module supports self-modifying pseudocode.

\* \* \* \* \*